United States Patent
Gagnon et al.

(10) Patent No.: US 10,719,299 B2
(45) Date of Patent: Jul. 21, 2020

(54) PHYSICAL CONNECTION OF NETWORK COMPONENTS IN A GRAPHICAL COMPUTER ENVIRONMENT WITH ONE-WAY SIGNAL PROPAGATION

(71) Applicant: PRATT & WHITNEY CANADA CORP., Longueuil (CA)

(72) Inventors: Jean Gagnon, Westmount (CA); Valeri Soukhostavets, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 969 days.

(21) Appl. No.: 14/486,527

(22) Filed: Sep. 15, 2014

(65) Prior Publication Data
US 2016/0078648 A1  Mar. 17, 2016

(51) Int. Cl.
  *G06F 8/34*     (2018.01)
  *G06F 30/00*    (2020.01)
  *G06F 111/20*   (2020.01)

(52) U.S. Cl.
  CPC ............. *G06F 8/34* (2013.01); *G06F 30/00* (2020.01); *G06F 2111/20* (2020.01)

(58) Field of Classification Search
  CPC . G06F 8/34; G06F 17/50; G06F 30/00; G06F 2111/20
  See application file for complete search history.

(56) References Cited

U.S. PATENT DOCUMENTS

| | | | |
|---|---|---|---|
| 7,363,600 B1 * | 4/2008 | Ballagh | G06F 17/5022 703/13 |
| 7,487,076 B2 | 2/2009 | Szpak et al. | |
| 7,519,523 B2 | 4/2009 | Szpak et al. | |
| 7,558,721 B2 | 7/2009 | Szpak et al. | |
| 7,761,273 B2 | 7/2010 | Szpak et al. | |
| 7,873,500 B1 * | 1/2011 | Brewton | G06F 17/5009 703/13 |
| 8,010,335 B2 | 8/2011 | Szpak et al. | |
| 8,024,167 B2 | 9/2011 | Szpak et al. | |
| 8,271,245 B1 | 9/2012 | Wood | |
| 8,280,712 B2 | 10/2012 | Szpak et al. | |
| 8,365,141 B1 | 1/2013 | Yan | |

(Continued)

*Primary Examiner* — Brian W Wathen
*Assistant Examiner* — Carina Yun
(74) *Attorney, Agent, or Firm* — Norton Rose Fulbright Canada LLP

(57) ABSTRACT

A system and method for physical connection of components in a graphical modeling environment. For each component, a physical component subsystem is built by providing at least one functional block representative of a mathematical model of the component, associating one or more first unidirectional internal input ports and/or one or more first unidirectional internal output ports with the at least one functional block, and associating one or more second unidirectional internal input ports and/or one or more second unidirectional internal output ports with the at least one functional block, the physical component subsystem configured to receive first information from an upstream block through each first internal input port, output second information to a downstream block through each first internal output port, receive third information from the downstream block through each second internal input port, and output fourth information to the upstream block through each second internal output port.

25 Claims, 21 Drawing Sheets

(56) References Cited

U.S. PATENT DOCUMENTS

| | | | |
|---|---|---|---|
| 8,397,214 B2 | 3/2013 | Hudson, III et al. | |
| 8,543,976 B1 | 9/2013 | Ghosh-Roy et al. | |
| 8,577,652 B2 | 11/2013 | Oh | |
| 8,612,871 B2 | 12/2013 | Correll et al. | |
| 2005/0096894 A1* | 5/2005 | Szpak | G06F 17/5009 |
| | | | 703/13 |
| 2011/0295578 A1* | 12/2011 | Aldrich | G06F 8/10 |
| | | | 703/6 |
| 2012/0316851 A1* | 12/2012 | Dalal | G06F 8/34 |
| | | | 703/6 |
| 2016/0085888 A1 | 3/2016 | Soukhostavets | |

* cited by examiner

PHYSICAL CONNECTION OF NETWORK COMPONENTS IN A GRAPHICAL COMPUTER ENVIRONMENT WITH ONE-WAY SIGNAL PROPAGATION

TECHNICAL FIELD

The application relates generally to a graphical computer environment for modeling of physical systems.

BACKGROUND OF THE ART

Physical systems, examples of which include fluid systems of engines, are typically modeled to predict selected physical variables, such as mass flow rates, pressures, temperatures, and two-phase mixtures quality, for physical components of the systems. These physical system (e.g. fluid system) models preferably have to be integrated with other engine systems models, such as control systems, into one user-friendly software package. The physical components then have to send information to and receive information from upstream and downstream components, in both directions. Such a requirement for two-way connection between physical components applies to networks of any physical nature.

In order to model the physical systems, graphical computer modeling environments and tools are typically used. However, known graphical computer environments commonly used for control system modeling, such as Matlab® and Simulink® from The MathWorks, Inc., or MATRIXx™ or SystemBuild™ from National Instruments Corporation, only provide a one-way signal propagation between graphical components (e.g. blocks). Models created in such environments represent the computational structure (e.g. mathematical equations and their interconnections) rather than the modelled physical system. This one-way signal propagation is further provided through connection lines between blocks or through coupled signal routing blocks, such as so-called From/Goto blocks in Simulink® and SystemBuild™. In order to use a graphical computer environment with one-way signal propagation for modeling two-way signal propagation, e.g. physical connection between components, a user has to manually add ports and connection lines for backward connection for each pair of blocks. This proves to be time-consuming in addition to yielding complex graphical networks, which can become unmanageable for large physical systems.

Alternatively, special connection blocks and ports for two-way signal propagation, which are not part of the graphical modeling environment with one-way propagation, may be used to provide two-way signal propagation. This however increases the complexity of the modeling process in addition to requiring the use of additional software. Moreover, functionalities of physical connection other than two-way signal propagation, such as blocks' parameters exchange, signals management, and connection errors trapping, which are required for modeling of large and complex systems, are typically not provided by known graphical modeling tools.

There is therefore a need for an improved system and method for graphical modeling of physical systems.

SUMMARY

In one aspect, there is provided a computer-implemented method for physical connection of components in a graphical modeling environment. The method comprises providing, for each of a plurality of physical components of a physical system, a physical component subsystem representative of the physical component in the graphical modeling environment; and providing a hierarchically-arranged representation of the physical system in the graphical modeling environment by interconnecting a plurality of physical component subsystems for representing a relationship between the plurality of physical components. Providing each physical component subsystem comprises providing at least one functional block representative of a mathematical model of the physical component, associating at least one of one or more first unidirectional internal input ports and one or more first unidirectional internal output ports with the at least one functional block, the physical component subsystem configured to receive first information from an upstream block through each of the one or more first internal input ports and to output second information to a downstream block through each of the one or more first internal output ports, and associating at least one of one or more second unidirectional internal input ports and one or more second unidirectional internal output ports with the at least one functional block, the physical component subsystem configured to receive third information from the downstream block through each second internal input port and to output fourth information to the upstream block through each second internal output port.

In another aspect, there is provided a system for physical connection of components in a graphical modeling environment. The system comprises a memory; a processor; and at least one application stored in the memory and executable by the processor for providing, for each of a plurality of physical components of a physical system, a physical component subsystem representative of the physical component in the graphical modeling environment; and providing a hierarchically-arranged representation of the physical system in the graphical modeling environment by interconnecting a plurality of physical component subsystems for representing a relationship between the plurality of physical components. Providing each physical component subsystem comprises providing at least one functional block representative of a mathematical model of the physical component, associating at least one of one or more first unidirectional internal input ports and one or more first unidirectional internal output ports with the at least one functional block, the physical component subsystem configured to receive first information from an upstream block through each of the one or more first internal input ports and to output second information to a downstream block through each of the one or more first internal output ports, and associating at least one of one or more second unidirectional internal input ports and one or more second unidirectional internal output ports with the at least one functional block, the physical component subsystem configured to receive third information from the downstream block through each second internal input port and to output fourth information to the upstream block through each second internal output port.

DESCRIPTION OF THE DRAWINGS

Reference is now made to the accompanying figures in which.

DETAILED DESCRIPTION

Figure 1:
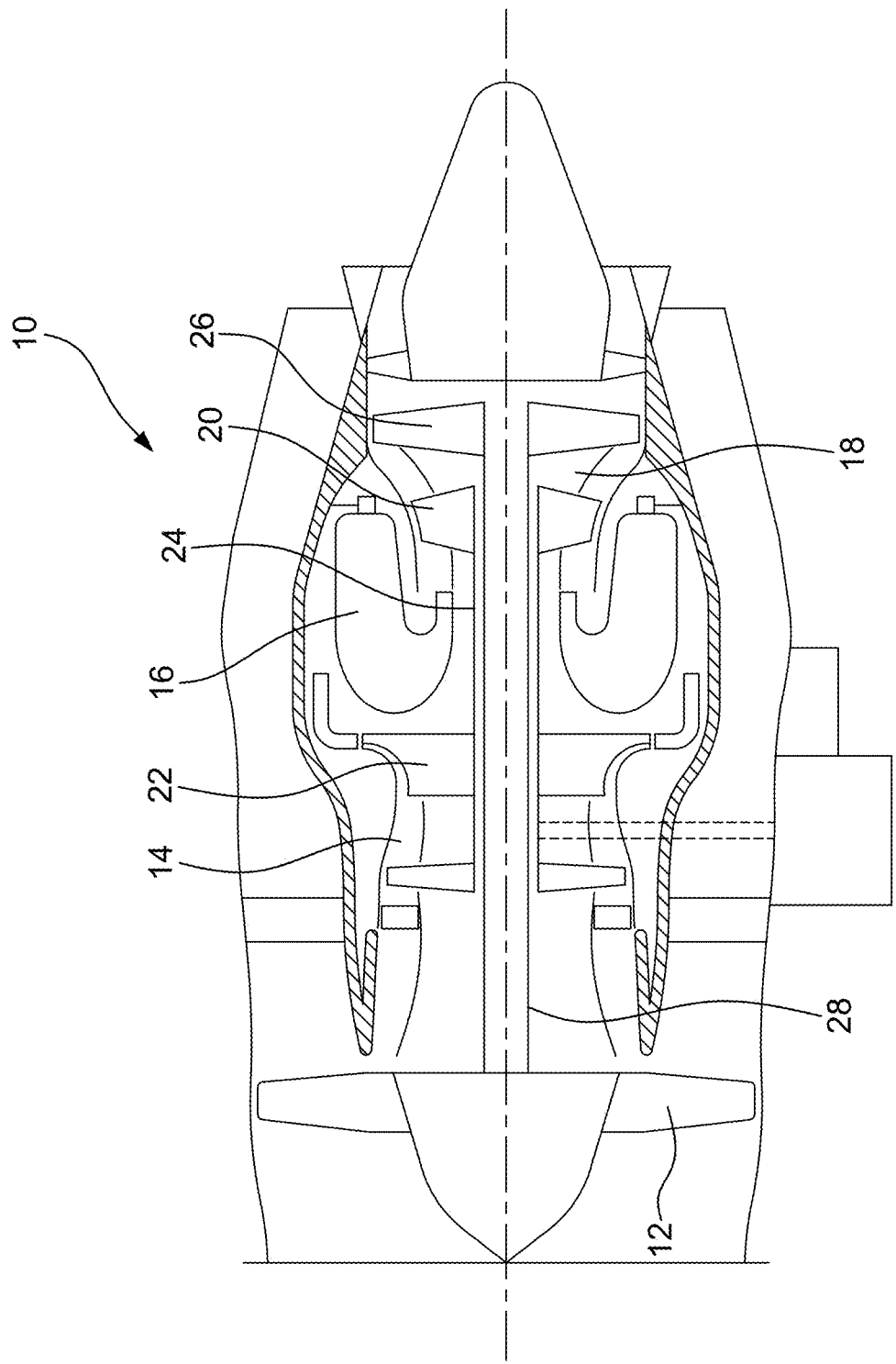
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply.

Figure 2:
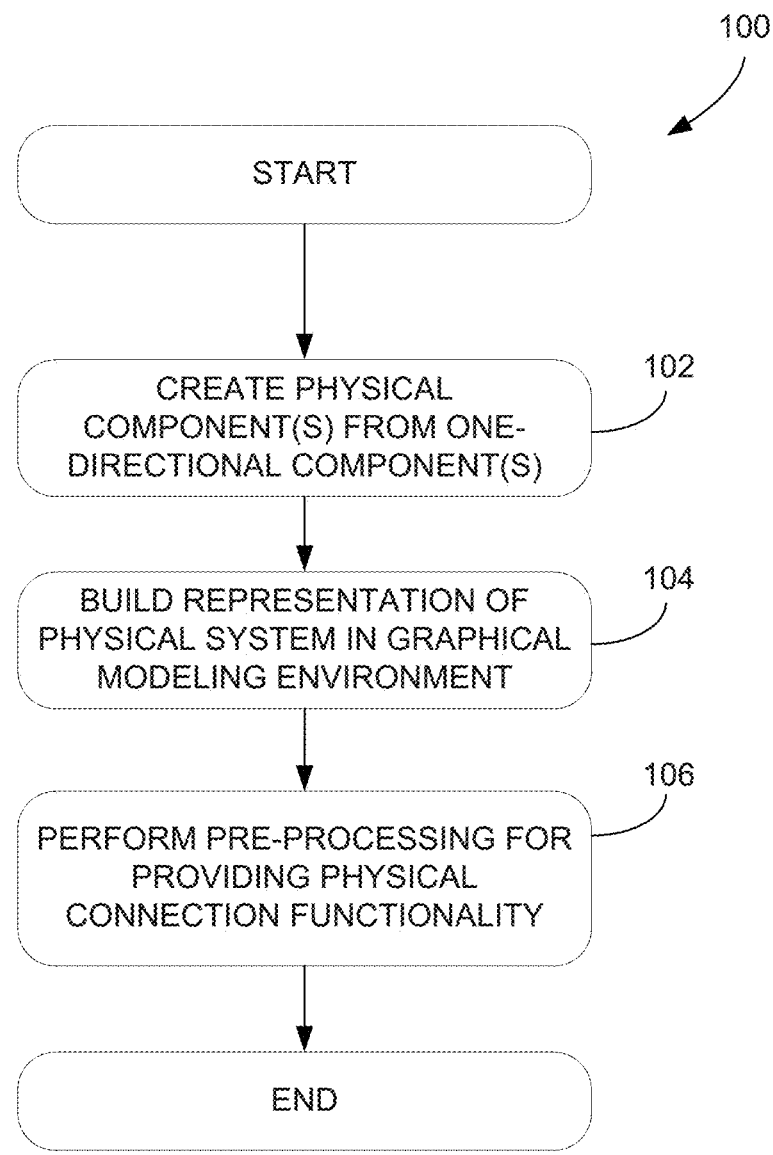
FIG. 2 is a flowchart of a method for physical connection of network components in a graphical computer modeling environment provided with unidirectional signal propagation, in accordance with one embodiment.

Referring now to FIG. 2, a method 100 for physical connection of network components in a graphical computer modeling environment provided with unidirectional (or one-way) signal propagation (or communication) will now be described. The method 100 can be used to build a model of a dynamic physical system, such as that of the engine 10 of FIG. 1, as a network of interconnected blocks (e.g. block diagrams). For example, a physical system of the engine 10, such as a fluid system, a control system, or the like, may be modeled, for the purpose of simulation and/or analysis, using a suitable graphical modeling environment. For this purpose, a graphical representation of a mathematical model of the physical system, with blocks in the model being connected through signals passing between connected blocks to mimic physical connections in the system, can be created. One type of graphical modeling environment (e.g. Simulink® from The MathWorks, Inc., LabView, System View, Signal Processing Workstation, HyperSignal, etc.) may allow to build signal-based networks that represent mathematical models of the physical systems. Another type of graphical modeling environment (e.g. Dymola, MapleSim, SimMechanics, SimDriveline, SimHydraulics, SimPowerSystems, etc.) may allow to build physically connected networks that represent physical structures of modelled systems. Hybrid models may also be created by using several graphical modeling environments, for example by combining the control system model created in Simulink® with the hydraulic system model created in Simhydraulics. Although an engine system is referred to herein for illustrative purposes, it should be understood that the method 100 and system for physical connection of network components described herein may apply to a variety of physical systems other than that of an engine.

Using the method 100 and system described further below, physical connection between physical components of a physical system can be provided. In particular, bidirectional (or two-way) signal propagation between blocks of a system's graphical representation can be achieved using only unidirectional components readily available in libraries of commercial graphical modeling tools and without the need for creating new connection blocks, lines, and/or ports that are not part of the available libraries. A model (i.e. a graphical representation of a physical system) with physical connection of network components built according to the method 100 may further use all available features and functionalities of the graphical modeling environment. As used herein, the term physical connection refers to a connection having functionalities of two-way signal propagation as well as parameters exchange between connected blocks, signals management, and connection errors trapping.

The method 100 illustratively comprises creating at step 102 a representation of one or more physical components from one-directional component(s) readily available in the computer graphical modeling environment (e.g. in the built-in model library that may include a library of built-in blocks and their associated parameters). As known to those skilled in the art, this may be done by a user interacting (e.g. moving graphical model components onto, editing, annotating, saving, printing, etc.) with a graphical user interface, such as a window presented on a display device (e.g. a screen), via suitable input/output devices, such as a mouse or keyboard (not shown). Once the physical component(s) are created in the graphical environment, a representation of the physical system may be built in the graphical modeling environment 104 by interconnecting the representations (e.g. blocks) of the physical components with one or more blocks from the model library of the graphical modeling environment. The next step 106 is then to perform pre-processing logic in order to provide the functionality of physical connection (includes bidirectional communication, e.g. backward connection, and parameter transfer) for physical components in the graphical model. Once the representation of the physical system has been built at step 104 and the functionality of physical connection provided at step 106, an execution engine may execute or simulate the mathematical model to trace the system outputs as a function of time.

Figure 3:
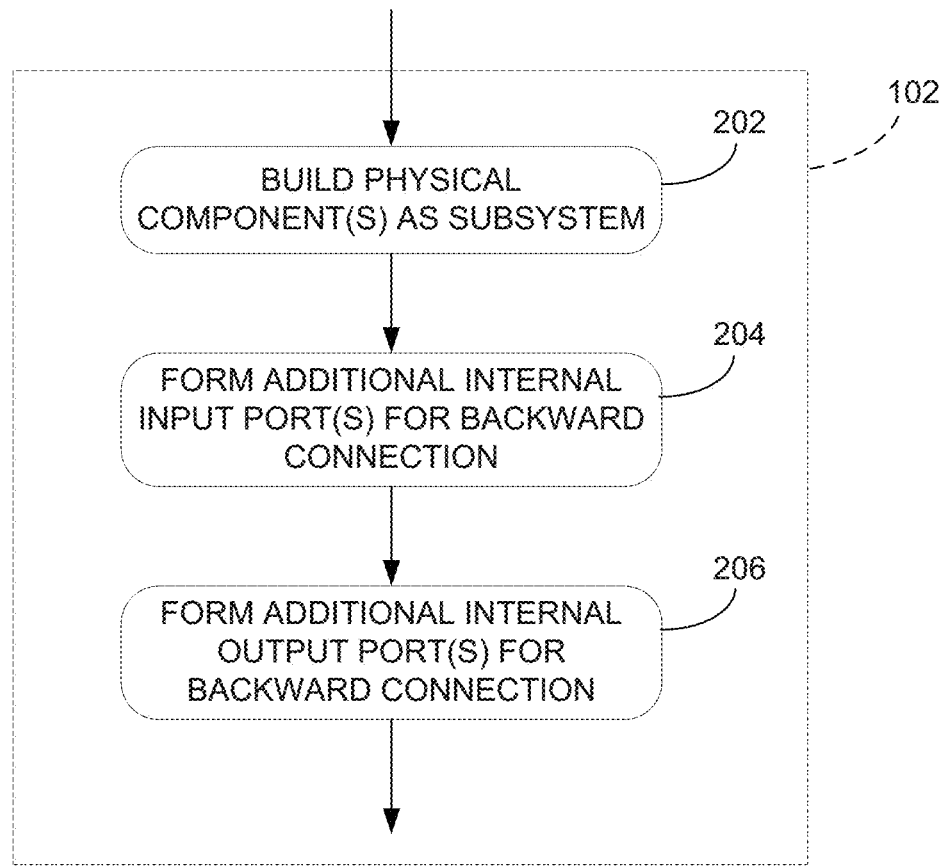
FIG. 3 is a flowchart of the step of FIG. 2 of creating physical components.

Referring to FIG. 3, the step 102 illustratively comprises building at step 202 each of the one or more physical components as a custom subsystem block, e.g. a masked subsystem having memory allocated thereto. It should be understood that unmasked subsystems may also apply. As a result, a library of custom blocks that could be reused in a variety of models and for various applications is illustratively created. The next steps are then to form, for each subsystem, additional internal input ports for backward connection at step 204 and additional internal output ports for backward connection at step 206, as will be discussed further below.

Figure 4A:
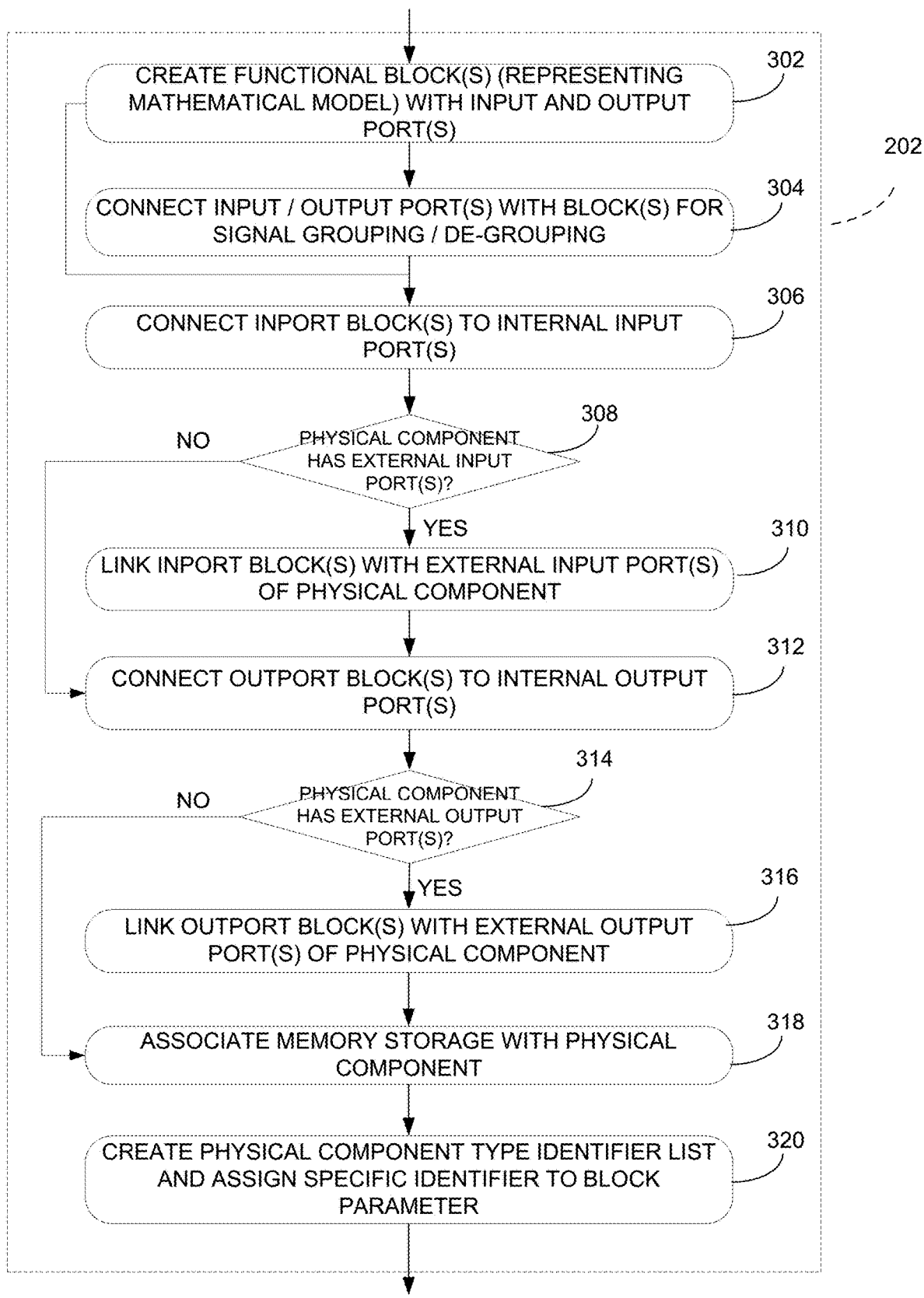
FIG. 4a is a flowchart of the step of FIG. 3 of building the physical component(s) as subsystems.
Figure 4B:
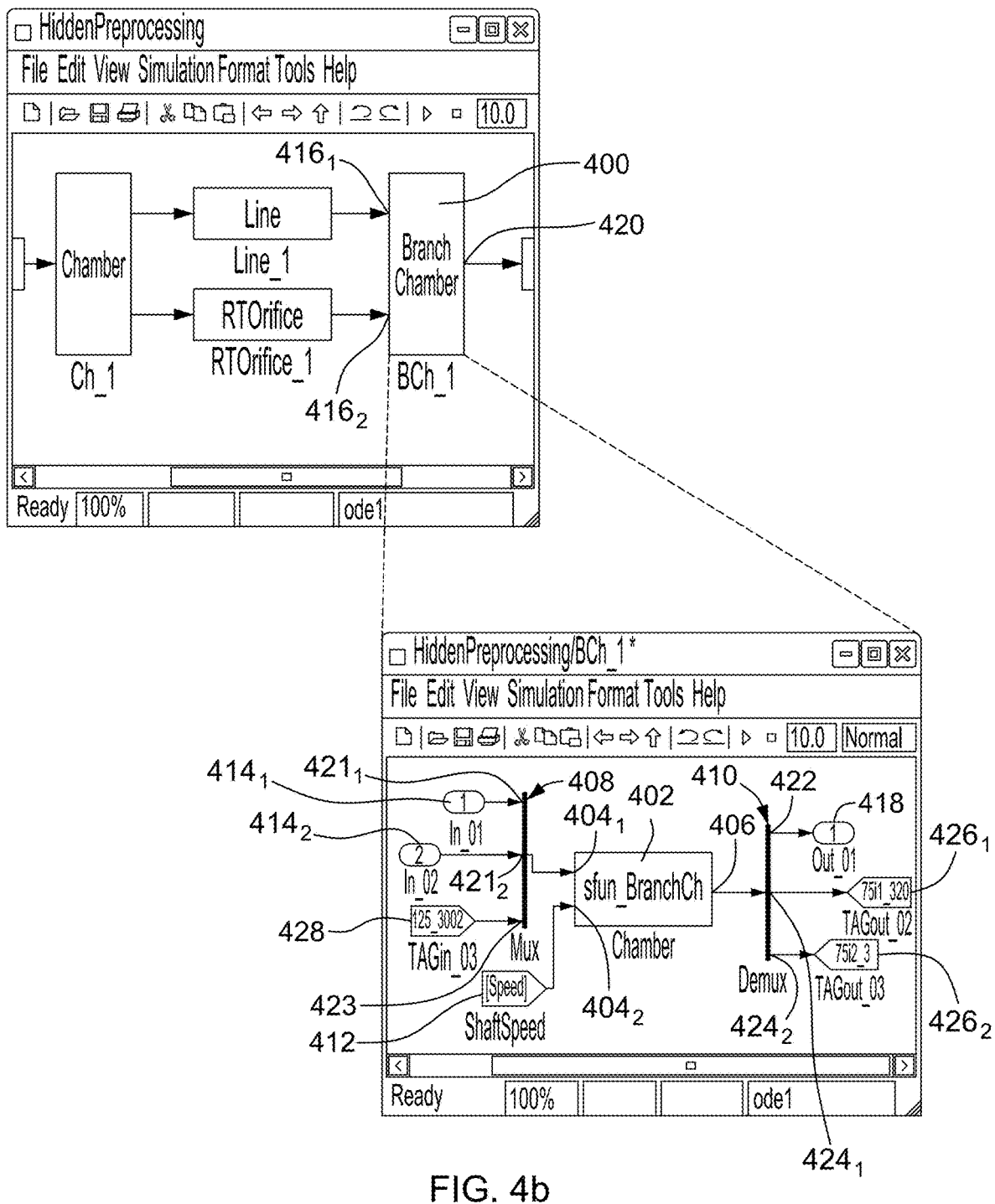
FIG. 4b is a screen capture illustrating creation of a physical component as a subsystem.

Referring now to FIG. 4a and FIG. 4b, the step 202 of building a physical component as a subsystem (e.g. a custom subsystem block) comprises creating at step 302 one or more functional blocks representing the physical component's mathematical model. This may be achieved using S-Functions from Simulink®. When created, the physical component built as a subsystem is illustratively at a first layer of the graphical model representing the physical system while the functional blocks comprising the subsystem are at another layer, e.g. at a layer provided at a lower hierarchical level than that of the first layer. In this manner, e.g. using masked subsystems, functionally related blocks for a given custom subsystem block can be kept together while the number of blocks displayed within a given window can be reduced by allowing internal components of a given subsystem block to be presented in a window separate from the main window in which the given subsystem block can be viewed.

FIG. 4b illustrates an embodiment where a branch chamber 400 is built as a physical component subsystem (e.g. a custom subsystem block) comprising several functional blocks each created with at least one input port and at least one output port. It should be understood that any physical component, for example restrictors, other than a branch chamber may be built as a subsystem. The branch chamber 400 illustratively comprises a chamber block 402 having two input ports as in 404$_1$, 404$_2$ and one output port as in 406. One or more of these input and output ports may be connected at step 304 with one or more blocks for signal grouping, e.g. Mux blocks, or blocks for signal de-grouping, e.g. Demux blocks. It should be understood that, depending on the number of input and output ports and additional input and output ports (discussed further below), blocks for signal grouping or de-grouping may not need to be provided. In the example shown in FIG. 4b, the upper input port 404$_1$ of block 402 is connected to an output port (not shown) of a signal grouping block 408 having three input ports (not shown) while the output port 406 of block 402 is connected to an input port (not shown) of a signal de-grouping block 410 having three output ports (not shown). The lower input port 404$_2$ of block 402 is also connected to a signal receiving (or From) block 412 configured to receive shaft speed information. For this purpose, the From block 412 accepts a signal from a matching signal sending (or Goto) block (not shown), then passes it as output. It should be understood that, if a graphical modeling environment other than Simulink® is used, signal routing blocks for lineless connection other than From and Goto blocks and which provide for a connection between input and output ports without connection lines may apply. Also, suitable implementations other than the use of signal routing blocks, such as using pointers for propagating information from one port to another, may apply.

One or more input blocks (referred to herein as inport blocks) may further be connected at step 306 with one or more of the signal grouping block's input ports. In the illustrated embodiment, a first inport block 414$_1$ and a second inport block 414$_2$ are connected to the input ports (not shown) of signal grouping block 408. It should be understood that, depending on the modeling to be achieved, inport blocks may be connected to any number of input ports.

The next step 308 may then be to determine whether the physical component built as a subsystem (e.g. the chamber 400) comprises external input port(s). The external input ports may be provided at a given hierarchical level higher than the level comprising the subsystem's functional blocks and used to enable the subsystem to receive information (e.g. via unidirectional connections, such as connection lines) from other blocks of the model, which are arranged at the given hierarchical level. Upon creation of the model representing the physical system, external ports of a given block may be automatically linked with internal ports. Linking between corresponding internal and external ports may be performed by name, number, or any other suitable manner. For example, when linking ports by number, upon the ports being created, the first created internal input port may be linked to the first created external output port, the second created internal input port may be linked to the second created external output port, and so on. It should be understood that other means of linking corresponding ports may apply. If it is determined at step 308 that the physical component subsystem comprises external input port(s), the inport block(s) may be linked (e.g. by number, name, etc.) at step 310 with the corresponding external input port(s) of the physical component. In the example of FIG. 4b, it can be seen that the chamber 400 has a first external input port 416$_1$ and a second external input port 416$_2$. The inport block 414$_1$ is therefore linked with external input port 416$_1$ while the inport block 414$_2$ is linked with external input port 416$_2$.

The next step 312 may then be to connect output blocks (referred to herein as outport blocks) with one or more of the signal de-grouping block's output ports. In the illustrated embodiment of FIG. 4b, an outport block 418 is connected to the output port (not shown) of the signal de-grouping block 410. Again, it should be understood that, depending on the system to be modeled, an outport block may be connected to any number of output ports. The next step 314 may then be to determine whether the physical component built as a subsystem (e.g. the chamber 400) comprises external output port(s). The external output ports may be provided at a given hierarchical level higher than the level comprising the subsystem's functional blocks and used to enable the subsystem to output information (e.g. via unidirectional connections, such as connection lines) to other blocks of the model, which are arranged at the given hierarchical level. If it is determined at step 314 that this is the case, the outport block(s) may be linked at step 316 with the corresponding external output port(s) of the physical component. In the example of FIG. 4b, it can be seen that the chamber 400 has a single output port 420 and the outport block 418 is therefore linked with the output port 420. The so-built physical component subsystem then has a given number of internal input and output ports that are used for straightforward connection with upstream and downstream blocks (not shown) provided in the model. In the case of the chamber 400, there is a total of two internal input ports (for straightforward connection with an upstream block), e.g. the ports as in $421_1$ and $421_2$ to which inport blocks $414_1$ and $414_2$ are connected, and one internal output port (for straightforward connection with a downstream block), e.g. the port as in 422 to which outport block 418 is connected.

Memory storage (not shown) may further be associated at step 318 with each physical component built as a subsystem, thereby allowing to assign and save parameter(s) of the physical component. These parameters may comprise any parameters relevant for the physical component, such as geometrical parameters (e.g. pipe diameter and/or length) of the physical component, a type of liquid flowing through the physical component, a component (e.g. shaft) from which to receive specific information (e.g. speed information), a number of inputs and outputs, and the like. The physical component parameters may also be indicative of a type (e.g. custom type) of the subsystem block. At step 320, a unique identifier list is also illustratively created and associated in memory with the physical component's parameters (e.g. parameters of the block representative of the physical component in the graphical environment). The identifier may comprise a unique number, name, class, subclass, or any other attribute suitable for uniquely identifying each subsystem block representative of a given physical component and indicating that the subsystem block is of a custom type (versus blocks from the model library, which can be referred to as being of a standard type). All created identifiers may be stored in memory as a list or in any other suitable manner. In addition, for each custom subsystem block, the memory storage may comprise data indicating establishment of a backward connection at a given port of the custom block.

Referring back to FIG. 3, once a custom subsystem block has been built in the manner described above with reference to FIG. 4a, additional internal input ports may be formed for backward connection at step 204. In particular, the additional internal input ports are illustratively created in the amount equal to the number of external output ports of the physical component. In the embodiment illustrated in FIG. 4b, the branch chamber 400 comprises one external output port 420 and one additional internal input port 423 is therefore formed in addition to the internal input ports $421_1$ and $421_2$ to which inport blocks $414_1$, $414_2$ are connected. In the illustrated embodiment, the additional internal input port 423 is created at the signal grouping block 408 but it should be understood that the use of signal grouping/de-grouping blocks is optional and that the internal input ports (for backward connection as in 423 or for straightforward connection as in $421_1$ and $421_2$) may be connected directly to the functional block as in 402 without connecting to a signal grouping block. The same may apply to internal output ports. Indeed, depending on the desired modeling, signal grouping/de-grouping blocks may be used to allow flexibility in the model as some functional blocks as in 402 allow several inputs/outputs while others only allow one (1) and would thus necessitate signal grouping/de-grouping for added functionality. The order of correspondence between the additional input ports and the external output ports created for the physical component may also be specified. For example, the order can be ascending if the first additional internal input port created for backward connection receives a backward signal from a destination block connected with the first external output port of the physical component. Extra internal input ports can also be formed for receiving additional signals from common source blocks in the model. For example, such ports can be configured to receive information about rotation of a component (e.g. shaft speed) or any other suitable information. This is the case of the lower input port $404_2$ of block 402, which, as discussed above, is connected to a signal receiving (or From) block 412 for receiving shaft speed information.

Additional internal output ports may also be formed for backward connection at step 206. In particular, the additional internal output ports are illustratively created in the amount equal to the number of external input ports of the physical component. In the embodiment illustrated in FIG. 4b, the branch chamber 400 comprises two external input ports $416_1$ and $416_2$ and a first additional internal output port $424_1$ and a second additional internal output port $424_2$ are therefore formed at the signal de-grouping block 410 in addition to the internal output port 422 (for straightforward connection) to which output port block 418 is connected. The order of correspondence between the additional output ports and the external input ports created for the physical component may also be specified in a manner similar to establishment of the order of correspondence between the additional input ports and the external output ports. Furthermore, other internal output ports can be created, for example to output information to a display block (not shown), connect to a terminator block (not shown), or the like.

Figure 5:
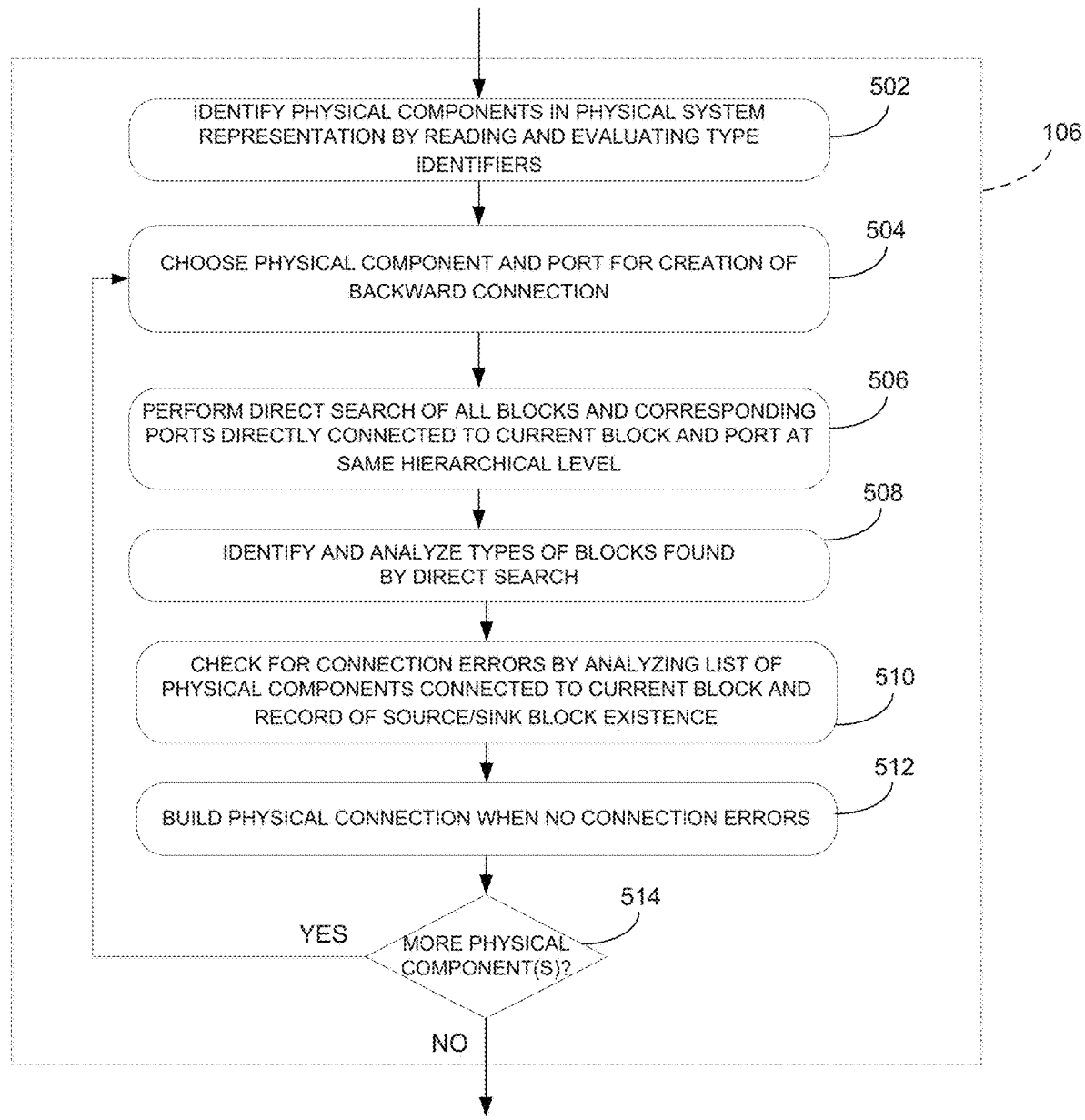
FIG. 5 is a flowchart of the step of FIG. 2 of performing pre-processing for providing physical connection.

Referring now to FIG. 5, the step 106 of performing pre-processing logic illustratively comprises identifying at step 502 one or more physical components (i.e. custom physical component subsystem blocks) in the model created at step 104 and for which backward connection is to be established. This may be done by querying a memory associated with the graphical modelling environment to retrieve parameters (e.g. mask type, block type) and/or identifiers (e.g. path name, unique number) associated with the model library blocks, the retrieved parameters indicating the type (e.g. standard) of the model library blocks, as well as reading and evaluating the unique identifier associated with the custom subsystem block. As discussed above, a unique block type identifier may be assigned to each custom subsystem block representing a given physical component and stored in a memory associated with the custom subsystem block. The memory storage for the custom subsystem blocks (i.e. the physical component subsystems) may be separate from or integral with the memory storage for the graphical modelling environment library blocks. More particularly, identification of the physical components may be performed in a centralized manner by searching in the model for all blocks (i.e. searching among the model library blocks and the custom subsystem blocks) having a parameter and/or identifier corresponding to the unique identifier created for the custom blocks. Alternatively, an instance of a computer code (e.g. callback function from Simulink®) may be created for each one of the custom subsystem blocks and executed to enable each custom block to independently determine which blocks are connected to its inputs and/or outputs.

The next step 504 may then be to choose, among the one or more physical components (i.e. custom subsystem blocks) identified at step 502, an initial physical component (referred herein as current initial subsystem block) and an initial external port of the physical component (referred herein as current initial port) for creation of a backward connection. The current initial block and current initial port may be chosen in such a sequence as to avoid a repetition of a backward connection or to avoid missing the creation of backward connection and leaving some ports unconnected. For this purpose, step 504 comprises conducting a search for a destination (or downstream) block and corresponding port for each output port of each physical component. Also, a search of a source (or upstream) block and corresponding port for each input port of each physical component may be conducted. Alternatively, blocks and ports may be selected one by one (in the order of the list of physical components identified at step 502) and step 504 may comprise verifying whether a backward connection has already been created for the selected block and port. Step 504 may also be performed in accordance with the type or group of components present in the model. For instance, for a model that includes two groups of physical components, e.g. restrictors that have one input and one output and nodes (or chambers) that have several inputs and outputs and where each restrictor is allowed to be connected between two nodes, both the search for a source block and port and the search for a destination block and port may be conducted for input ports and output ports of each restrictor (e.g. each restrictor connects to each chamber in this case).

The next step 506 may then be to search for all blocks and their corresponding ports, which are directly connected (e.g. by directed connection lines or other suitable connections) to the current initial block and current initial port at a same hierarchical level of the model. This corresponds to performing a direct search for the current initial block. The block types for all blocks found by the direct search performed at step 506 may then be identified and analyzed at step 508, as will be discussed further below. Block types can be found, for example, by reading the relevant parameters of the standard (or built-in) model library blocks (e.g. Mask Type, Block Type in any Simulink® blocks) as well as reading the unique identifier for the custom subsystem blocks representative of the system's physical components. In one embodiment, the search may be performed at step 506 by analysis of the model's connectivity, which is a part of the model's description provided by the modeling graphical environment. The connectivity of a model may be available in a number of ways including but not limited to, from block parameters or directly parsing model (e.g. text) files. For this purpose, the search of connected physical components and their ports at each hierarchical level of the model may be conducted by searching input and output handles (e.g. connection identifiers) for all connection lines, searching handles of all ports of the physical components, searching ports having handles (e.g. port identifiers) corresponding to the connection lines handles, and, when a match between port handles and connection lines handles is found, identifying connected components as components connected by a corresponding line. It should be understood that two blocks may be connected via their external ports using any suitable connections other than a single connection line. For example, a connection comprising a first connection line, a second connection line, and two matching signal routing blocks (e.g. a From block and matching GoTo block), with the first connection line connected between the first block and the From block and the second connection line between the GoTo block and the second block, may apply. Other suitable configurations may also apply.

Once the block types have been identified and analyzed, the next step 510 is illustratively to check for connection errors. As will be discussed further below, this may be done by analyzing the list of custom subsystem blocks (representative of physical components) directly connected to the current initial block and the record of the existence of source/sink blocks, as obtained at step 508. If connection errors are found, suitable corrective actions are taken until no connection error is found. Alert message(s) may also be output. Otherwise, once is determined that no connection error exists (and the block connected to the current initial physical component and with which the physical connection is to be established is a physical component), the method 100 flows to the step 512 of building a physical connection in the manner discussed further below. The next step 514 is then to determine whether there are still one or more additional physical components among the ones identified at step 502 for backward connection. If this is the case, the method 100 flows back to the step 504 of choosing the next physical component for backward connection building and steps 506 to 514 are then repeated once more. Otherwise, if no more physical components are left, the step 104 is completed.

Figure 6:
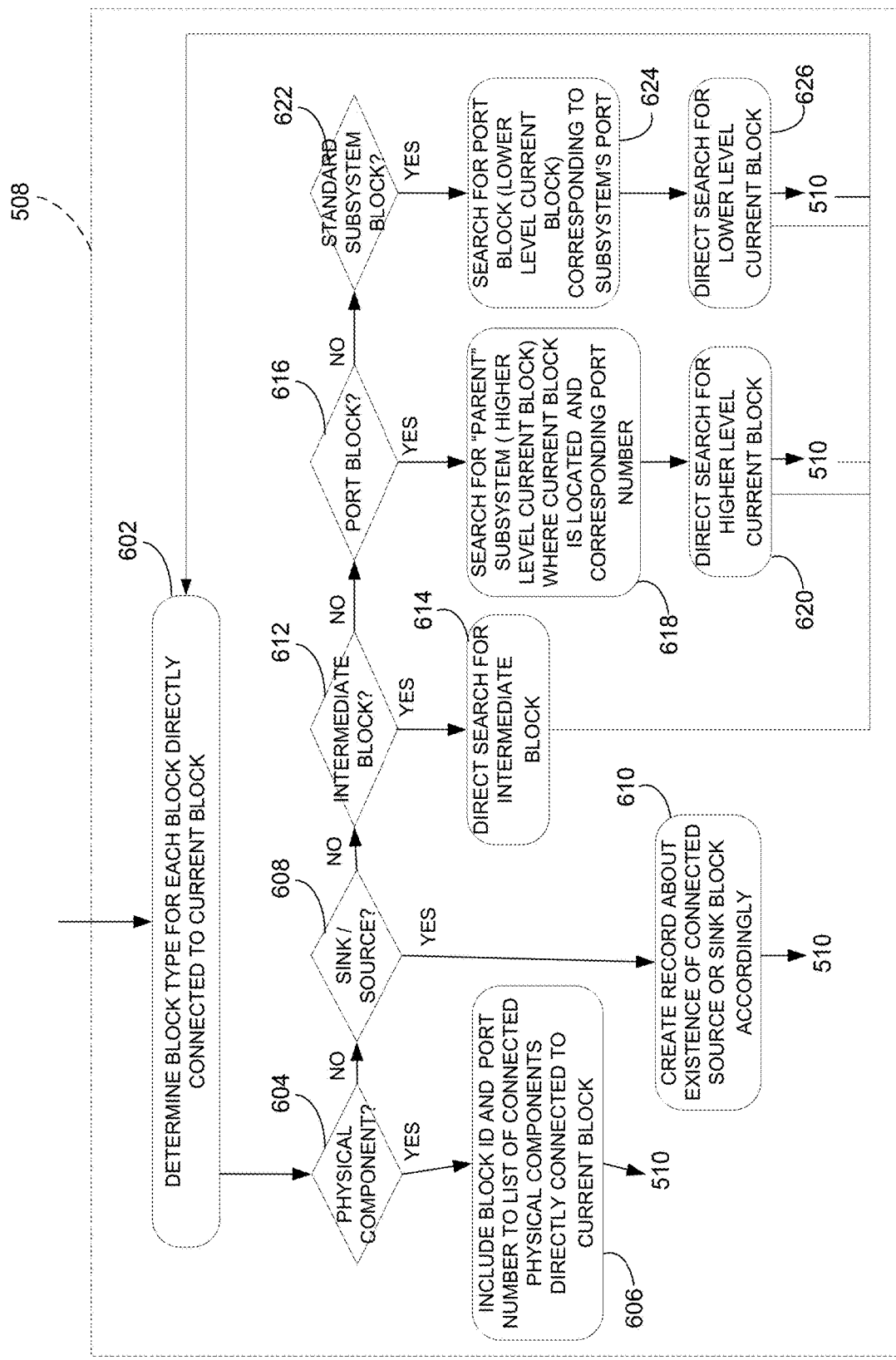
FIG. 6 is a flowchart of the step of FIG. 5 of identifying and analyzing types of blocks found by direct search.

Referring now to FIG. 6, the step 508 of identifying and analyzing block types comprises determining (e.g. from type identifier parameters) at step 602 the block type of each block directly connected to the current block, e.g. the current initial block. The block types determined at step 602 include, but are not limited to, physical components, sink blocks, source blocks, intermediate blocks, port blocks, and subsystem blocks. It should be understood that other types may apply. Any block initially included in the model library of the graphical environment may indeed apply. Thus, the next step 604 may then be to determine if the directly connected block in question is a physical component, i.e. a custom subsystem block. If this is the case, the block identifier (or ID) and the number of the block's port connected to the current initial block are included at step 606 in a list of physical components (i.e. custom subsystem blocks) directly connected to the current initial block, the list being stored in memory. In one embodiment, the list can include the IDs of all connected physical components (or only that of the last one identified) together with the number of connected physical components. The method 100 may then flow to step 510 of checking for connection errors.

If it is determined at step 604 that the block directly connected to the current initial block is not a physical component, the next step 608 is to determine whether the block is a sink or source. This may be the case provided sink or source blocks are allowed by connection rules applied for the graphical model, if any. The allowed sink or source blocks can be sink or source blocks from the model library found in the graphical modeling environment or specially-created blocks. If it is determined at step 608 that the block directly connected to the current initial block is a sink or source type block, the next step 610 is to accordingly create a record about the existence of the connected source or sink block(s). The method 100 may then flow to step 510. It should be understood that the sequence of steps 604, 608, 612, 616, and 622 (discussed further below) may be varied. For instance, after determining that the block is not a physical component, the next step may be to determine whether the block is a subsystem block. It should also be understood that the steps performed when implementing the pre-processing logic may be rearranged and/or redistributed in any suitable manner.

If it is determined at step 608 that the block directly connected to the current initial block is not a sink or source block, the next step 612 may be to determine whether the block is an intermediate block, i.e. a block connected between two other blocks, i.e. the current initial block and another block. If this is the case, the next step 614 may be to conduct the direct search (mentioned herein above with reference to FIG. 5) for the intermediate block. An intermediate block can be any block or some allowed block from the graphical modeling environment, according to connection rules applied for the model. An intermediate block can also be a block specially created by the user for debugging, plotting, or the like. After the direct search has been performed, the method 100 may flow back to the step 602 of determining the block type for each block directly connected to the current block, i.e. directly connected to the intermediate block and the process of FIG. 6 is repeated.

If it is determined at step 612 that the block directly connected to the current initial block is not an intermediate block, the next step 616 may be to determine whether the block is a port block. Such a port block may be represented by an Inport Simulink® block or an Outport Simulink® block in the graphical modeling environment, as discussed above. If it is determined that the block is a port block, the next step 618 may be to search for the parent subsystem, i.e. the higher level block, where the current block (i.e. the port block) is located as well as the corresponding port number. A direct search may then be conducted at step 620 for the higher level block. In one embodiment, the method 100 may then flow back to the step 602 of determining the block type for each block directly connected to the current block, i.e. to the higher level block. Alternatively, the method 100 may flow back to the step 510 of checking for connection errors prior to flowing back to the step 602 of determining the block type.

If it is determined at step 616 that the block directly connected to the current initial block is not a port block, the next step 622 may be to determine whether the block is a standard subsystem block, i.e. a subsystem among the graphical modeling environment library blocks found in the built-in library of the graphical modeling environment. Such a standard subsystem block may be obtained from the model library. In some embodiments, the standard subsystem block may comprise one or more of the custom subsystem blocks. If this is the case, i.e. the block is a standard subsystem block, the next step 624 may be to search for a port block, i.e. a lower level block, corresponding to the port connected to the current initial block. This lower level block may be an inport block or an outport block if the subsystem port connected to the current initial block is an input port or an output port, respectively. A direct search may then be conducted at step 626 for the lower level current block. In one embodiment, the method 100 may then flow back to the step 602 of determining the block type for each block directly connected to the current block, i.e. to the lower level block. Alternatively, the method 100 may flow back to the step 510 of checking for connection errors prior to flowing back to the step 602 of determining the block type.

Figure 7:
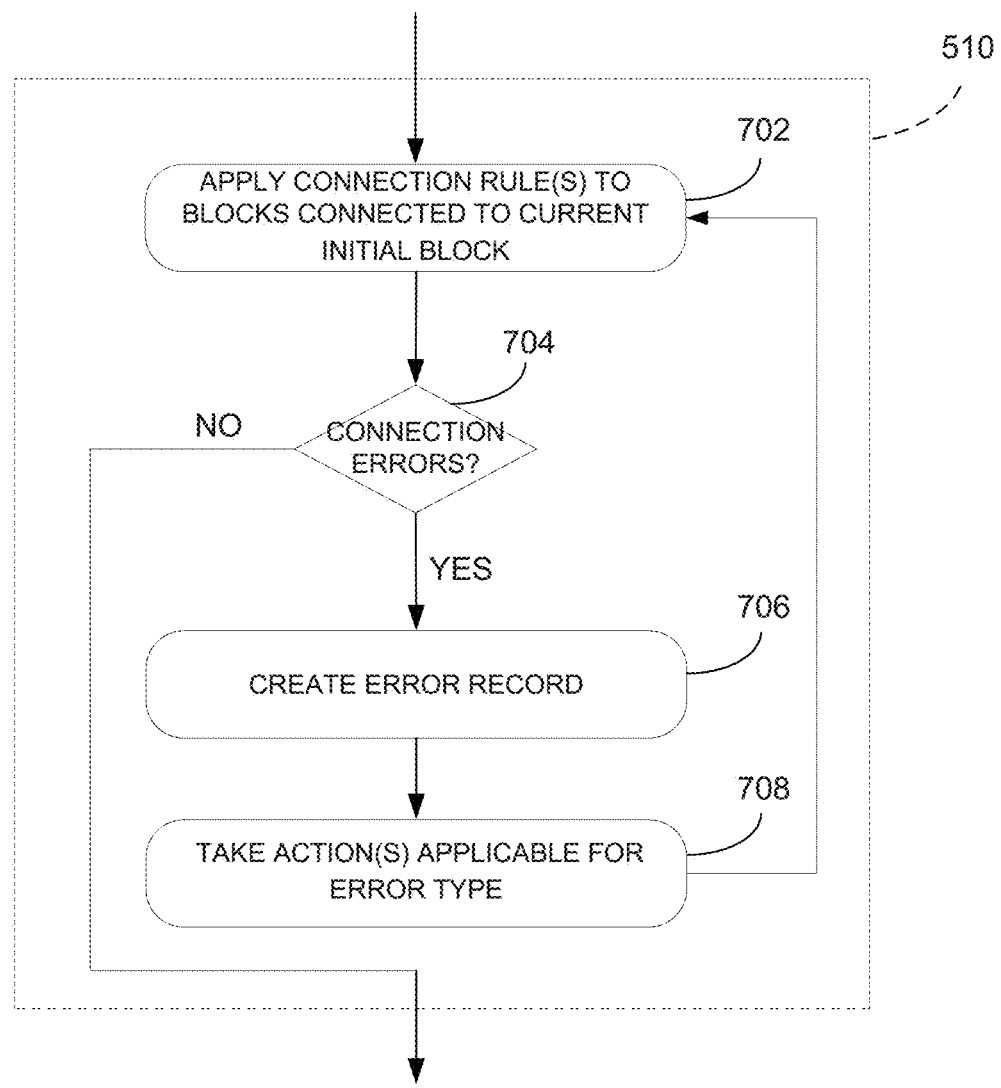
FIG. 7 is a flowchart of the step of FIG. 5 of checking for connection errors.

Referring now to FIG. 7, the step 510 of checking for connection errors may be performed by analysis of the list of physical components connected to the current initial block and the record of existence of source or sink blocks. For this purpose, step 510 illustratively comprises applying at step 702 one or more connection rules to the list of blocks connected to the current initial block. The connection rules may be retrieved from memory. The connection rules may comprise any specific rules for a given model or general physical compatibility rules including, but not limited to, a rule that the physical component can be connected with only one physical component, a rule that a flow restrictor cannot be connected with an electrical restrictor, a rule that a flow restrictor is to be connected between two chambers, a rule that a thermo-restrictor is to be connected with a flow chamber directly, and the like. Once the one or more connection rules have been applied, the next step 704 may be to determine from the outcome of applying the rule(s) whether connection errors exist. If no connection error exist, the next step is the step 512 of building a physical connection. Otherwise, if at least one error is present, the next step 706 is to create an error record and take actions applicable for the error type at step 708. For example, such corrective actions can include, but are not limited to, stopping the physical connection establishment process and/or building the connection for the next physical component. It should be understood that establishment of the physical connection may be stopped for the current initial block only (and the physical connection then built for the next physical component subsystem) or for all blocks altogether until the defect is corrected. The applicable corrective actions applied at step 708 may be retrieved from memory. The method may then flow back to step 702 to determine whether the connection error remains.

Figure 8:
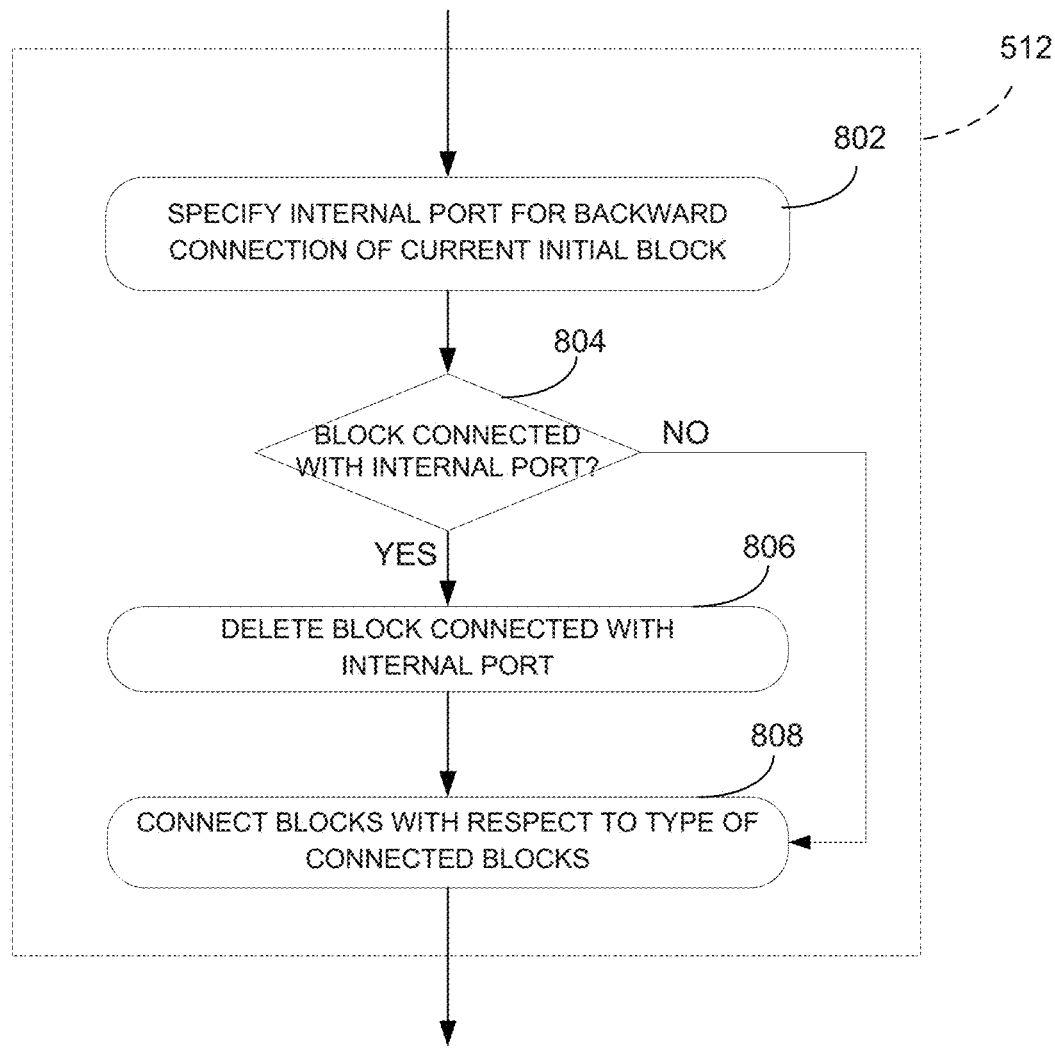
FIG. 8 is a flowchart of the step of FIG. 5 of building backward connection.

Referring now to FIG. 8, the step 512 of building at step 802 a physical connection between the current initial subsystem block and a given block connected (directly or not) to the current initial block illustratively comprises specifying an additional internal port of the current initial block for creation of the backward connection. The specified internal port may be the port assigned to send a backward signal to the given block (with the given block being a downstream block) or receive the backward signal from the given block (with the given block being an upstream block), the given block connected to the current initial blocks's external port (e.g. external input or output port, according to whether the given block is an upstream or downstream block). The next step 804 may then be to determine if any block, e.g. an inport block or an outport block, is connected to the additional internal port specified at step 802. If this is the case, the block may be deleted at step 806. If no block is connected with the internal port or after performing step 804, the next step 808 is to establish the backward connection by connecting blocks in accordance with the type of the given block with which physical connection is to be established.

Figure 9A:
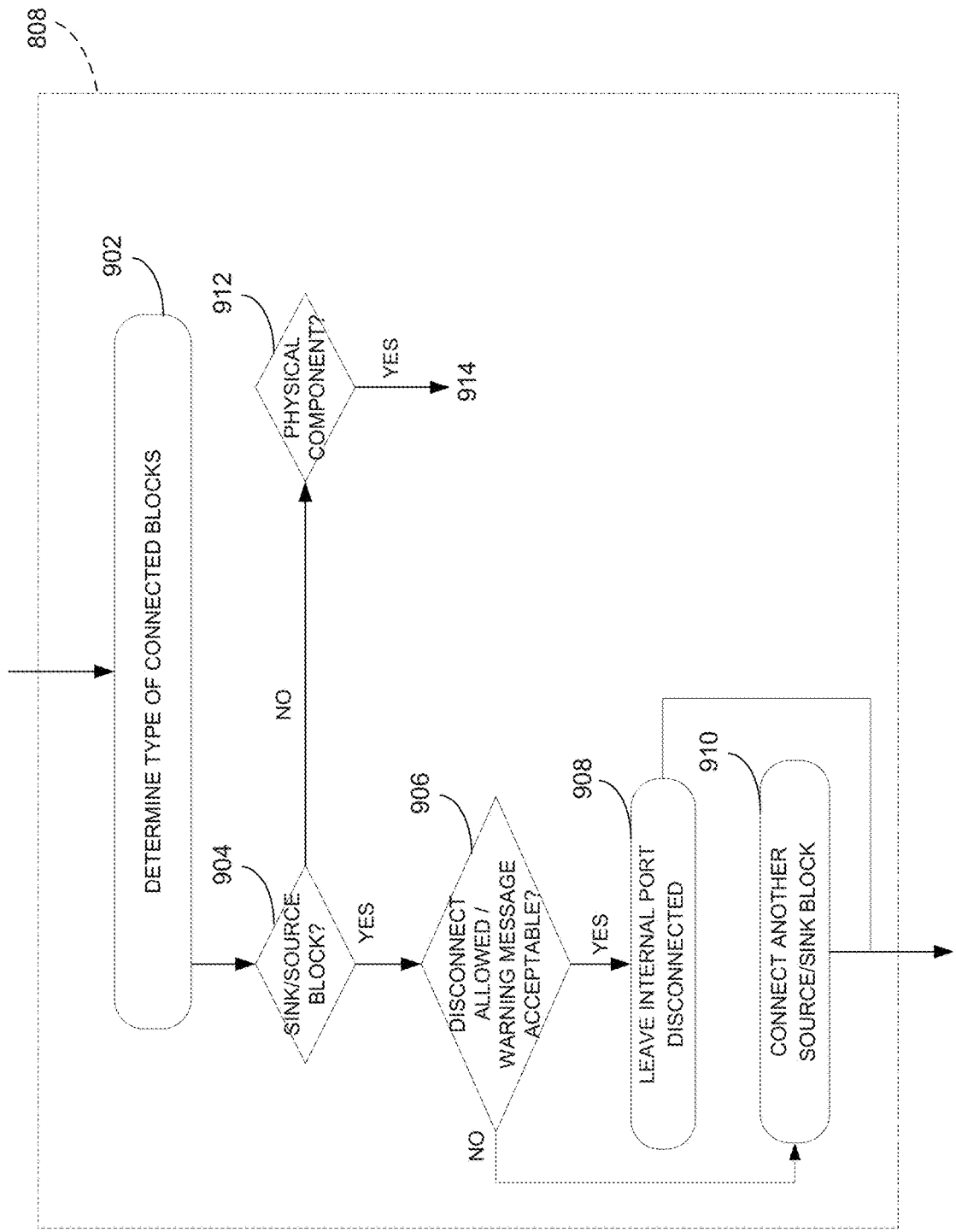
FIG. 9a and FIG. 9b are flowcharts of the step of FIG. 8 of connecting blocks with respect to a type.

As seen in FIG. 9a, the step 808 illustratively comprises determining at step 902 (e.g. from unique identifier and/or block parameters) the type of the connected block. As seen from FIG. 6 above, after step 508 is performed, the connected block can be classified as either a sink/source block or a custom subsystem block (i.e. a physical component subsystem) The next step 904 may thus be to determine whether the connected block is a sink or source block. If this is the case, the backward connection need to be established as, illustratively, no backward signal needs to be exchanged with sink/source blocks. The next step 906 may then be to determine whether the graphical modeling environment allows for ports to be left disconnected or if the resulting warning message is acceptable. If this is the case, the specified additional internal port may be left disconnected at step 908. Otherwise, the additional internal port may be connected to another source or sink block at step 910. For example, the additional internal port of the current initial subsystem block may be connected to a Ground or Termination block, depending on whether the port of the current initial block is an input or output port. In this manner, establishment of backward connection can be terminated.

Figure 9B:
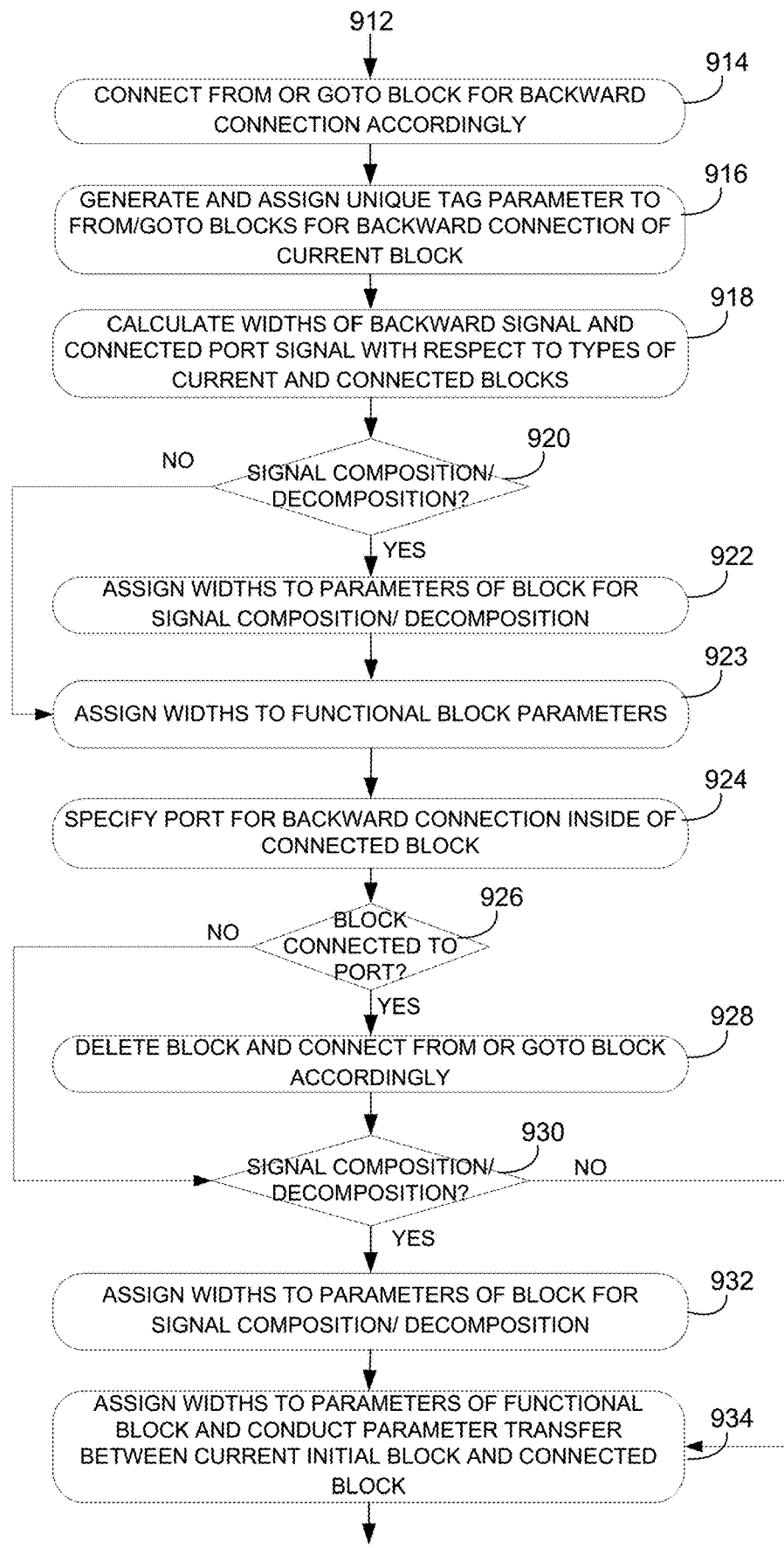

If it is determined at step 904 that the connected block is not a sink or source block, the next step 912 may be to determine whether the block is a physical component (i.e. a custom subsystem block). As shown in FIG. 9b, when it is determined that this is the case, the next step 914 may be to connect to the specified additional internal port a signal routing block, such as a From (or signal receiving) or Goto (or signal sending) block (depending on whether the port of the current initial block is an input or output port), for backward connection at the current initial block. As illustrated in FIG. 4b, a Goto block 426$_1$ is connected to the additional internal output port $424_1$ for backward connection of the branch chamber 402 towards another physical component (e.g. for passing the Goto block's input towards a corresponding From block of a restrictor, not shown). It should be understood that more than one From and Goto blocks may be provided, at least one of which may be used for backward connection to other physical components. Indeed, for the example illustrated in FIG. 4b, there is provided a second Goto block $426_2$ (connected to the additional internal output port $424_2$) as well as a first From block 412 (discussed above) and a second From block 428 (connected to the additional internal input port 423). It should also be understood that the backward connection may be implemented using other techniques than with From or Goto blocks. For instance, pointers may be used, as discussed above.

The next step 916 may then be to generate and assign (e.g. in memory) a unique tag parameter to the From or Goto blocks connected at step 914. The width of the backward signal to be output by the current initial subsystem block to the connected block, with the connected block being an upstream block (or alternatively received by the current initial subsystem block from the connected block, with the connected block being a downstream block), as well as the width of the port signal (e.g. input signal) received at the current initial subsystem block from the connected block, with the connected block being an upstream block (or of the output signal sent by the current initial subsystem block to the connected block, with the connected block being a downstream block) may then be computed at step 918 using knowledge of parameters (e.g. the types) of the current initial block and the connected block. Indeed, different blocks may require different signals and the block parameters may indicate that the physical component represented by the current initial block is a chamber configured to transmit a first signal having three (3) components, namely a pressure measurement, a temperature measurement, and a quality measurement, to a first type of block and transmit to a second type of block a second signal comprising a tangentional velocity measurement in addition to the three components previously mentioned. In order to properly decode input and output signals exchanged between the current initial block and the directly connected block, it is desirable for the width information to be properly taken into account.

The next step 920 may therefore be to determine whether signal composition or decomposition is used in the model, i.e. whether the one or more functional blocks provided in the custom subsystem block comprise a Mux and/or Demux block. If this is the case, the widths computed at step 918 may be assigned at step 922 to parameters of the block for signal composition or decomposition. After step 922 has been performed or if it is determined at step 920 that signal composition or decomposition is not provided for the current initial block, the next step 923 is illustratively to assign (in the memory associated with the physical component subsystem) the widths computed at step 918 to parameters of the functional block. An additional internal port inside of the connected block may then be specified at step 924 for establishing the backward connection. The additional internal port may be specified at step 924 in accordance with the type (e.g. input or output) of additional internal port specified for the current initial block. For example, if the specified additional internal port of the current initial block is an output port, the specified additional internal port of the connected block is an input port. The additional internal port of the connected block is also illustratively specified to correspond to the port number (or name) of the additional internal port of the current initial block. Also, the additional internal port of the connected block may be selected among unconnected ports for the connected block.

It may then be assessed at step 926 whether any block, e.g. inport block and/or outport block, is connected to the port specified at step 924. If this is the case, the block may be deleted and a From or Goto block (depending on whether the port specified at step 924 is an input or output port) connected at step 928 in place of the deleted block. It should be understood that blocks may be deleted at steps 806 and 928 provided they are not signal routing (e.g. From or Goto) blocks. The From or Goto block connected at step 928 is illustratively assigned a unique tag parameter that matches (e.g. is the same as) the one of the From or Goto block created at step 914. In this manner, the From or Goto block of the current initial subsystem block is configured for connection (e.g. without a connection line) with the From or Goto block of the directly connected block for establishing the backward connection.

After step 928 has been performed or if it is determined at step 926 that no block is connected to the port, the next step 930 may again be to determine whether signal composition or decomposition is provided for the directly connected block. If this is the case, the next step 932 is to assign the width of the backward connection signal and the width of the connected port signal computed at step 918 to parameters of the block for signal composition or decomposition (e.g. the Mux/Demux block). After step 932 has been performed or if it is determined at step 930 that signal composition or decomposition is not provided, the next step 934 is illustratively to assign (e.g. in the memory associated with the connected block) the widths computed at step 918 to parameters of the functional block found in the connected block. Parameter transfer between the current initial subsystem block and directly the connected block may then be conducted to complete establishment of the backward connection.

In one embodiment, each event of backward connection building related to a given physical component (e.g. a destination or source restrictor connected with a chamber) may further be written into block parameters. A final inspection of backward connections established for each port of a given subsystem block may then be conducted and error message(s) generated in a case of missed ports. In addition, the search of connected physical components and connected ports for each input and output ports of each physical component, as performed at step 504 of FIG. 5, may be conducted for each physical component with the generation of a connectivity record that may be created by the graphical environment. For each next chosen physical component for which backward connection is to be established, a verification of existing connectivity records may be conducted.

Figure 10:
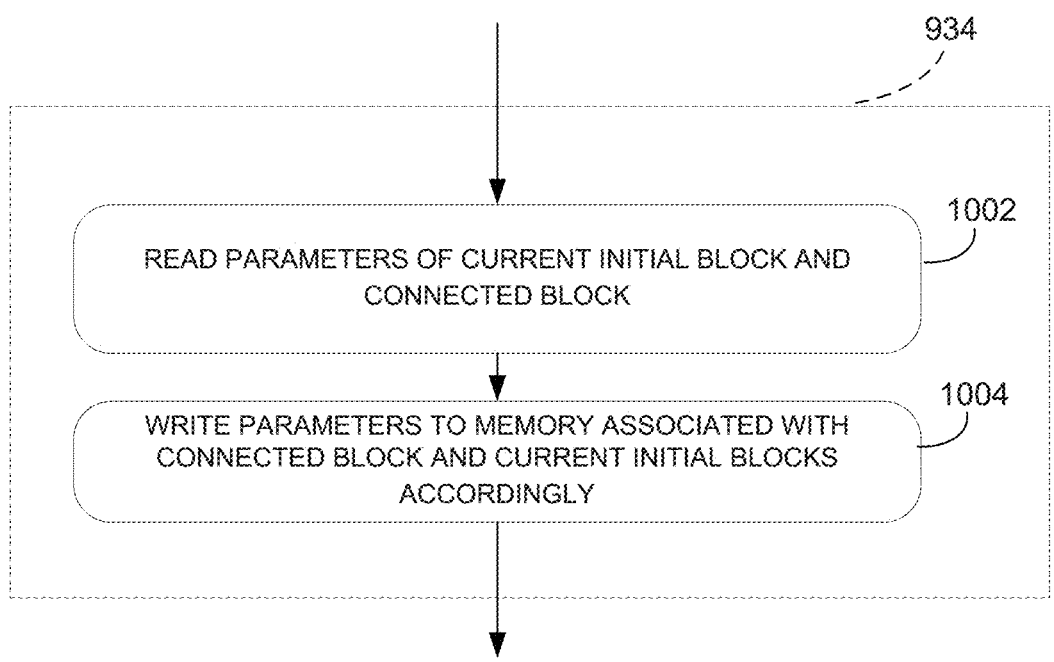
FIG. 10 is a flowchart of the step of FIG. 9b of conducting parameter transfer.

Referring now to FIG. 10, parameter transfer between the current initial block and the connected block (with which physical connection functionality is to be established) may be performed at step 934 by reading (from memory) at step 1002 parameters associated with the current initial block and the connected block. The read parameters may be parameters required by the blocks' mathematical models and computational procedures. For instance, parameters (e.g. static pressure for a chamber or radius for a restrictor) required for calculations to be performed within the connected block may be read. The information is then accordingly set at step 1004 to parameters of the connected block and the current initial blocks, e.g. parameters of the current initial block are read and stored in the memory associated with the connected block and parameters of the connected block are read and stored in the memory associated with the current initial block.

Figure 11:
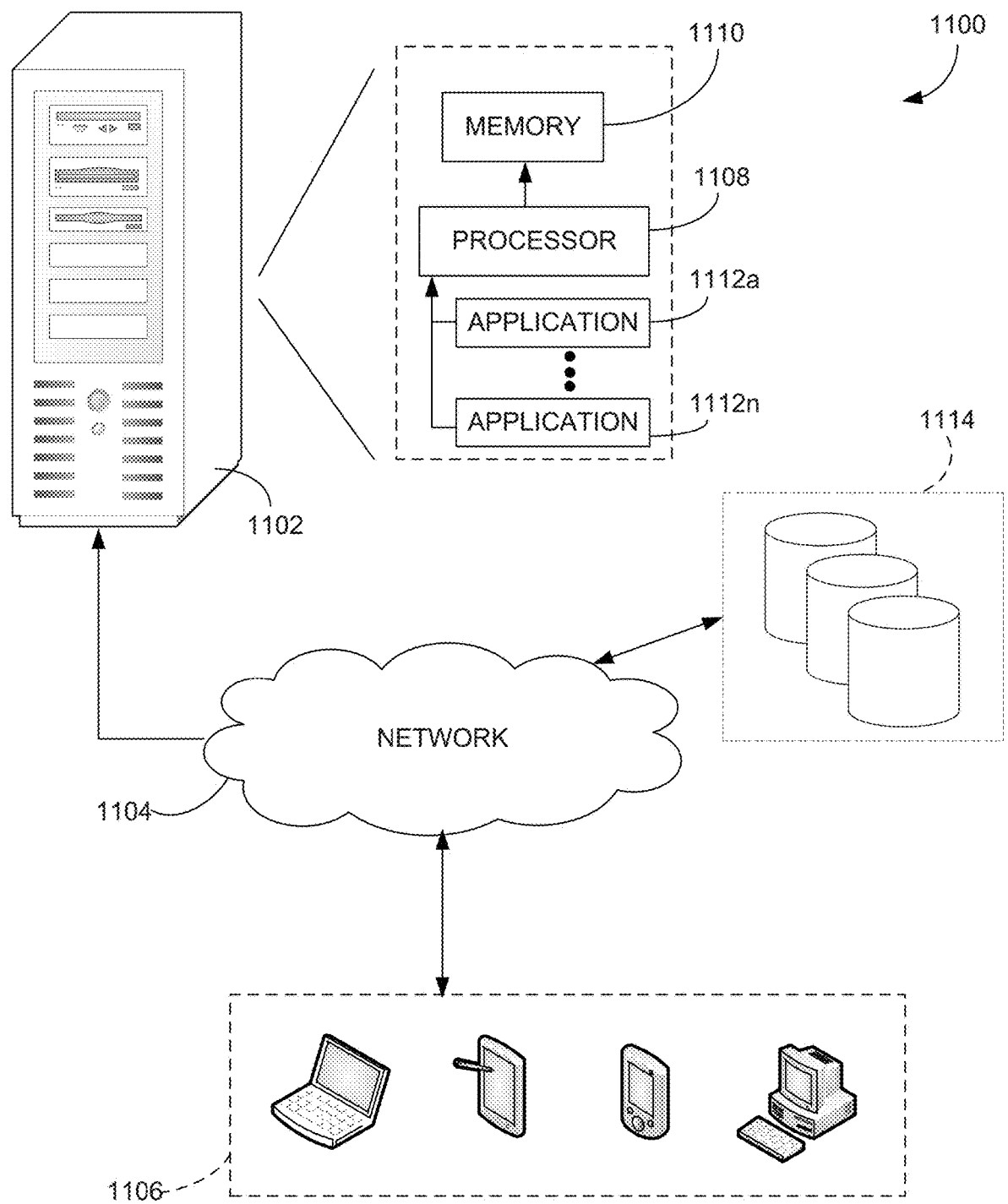
FIG. 11 is schematic diagram of a system for physical connection of network components in a graphical computer modeling environment provided with unidirectional signal propagation, in accordance with one embodiment.

Referring now to FIG. 11, a system 1100 for physical connection of network components in a graphical computer modeling environment provided with unidirectional (or one-way) signal propagation will now be described. The system 1100 comprises one or more server(s) 1102 accessible via the network 1104. For example, a series of servers corresponding to a web server, an application server, and a database server may be used. These servers are all represented by server 1102. The server 1102 may be accessed by a user using one of a plurality of devices 1106 adapted to communicate over the network 1104. The devices 1106 may comprise any device, such as a personal computer, a tablet computer, a personal digital assistant, a smart phone, or the like, which is configured to communicate over the network 1104, such as the Internet, the Public Switch Telephone Network (PSTN), a cellular network, or others known to those skilled in the art. Although illustrated as being separate and remote from the devices 1106, it should be understood that the server 1102 may also be integrated with the devices 1106, either as a downloaded software application, a firmware application, or a combination thereof. It should also be understood that several devices as in 1106 may access the server 1102 at once.

The server 1102 may comprise, amongst other things, a processor 1108 coupled to a memory 1110 and having a plurality of applications 1112a . . . 1112n running thereon. It should be understood that while the applications 1112a . . . 1112n presented herein are illustrated and described as separate entities, they may be combined or separated in a variety of ways.

One or more databases 1114 may be integrated directly into the memory 1110 or may be provided separately therefrom and remotely from the server 1102 (as illustrated). In the case of a remote access to the databases 1114, access may occur via any type of network 1104, as indicated above. The various databases 1114 described herein may be provided as collections of data or information organized for rapid search and retrieval by a computer. The databases 1114 may be structured to facilitate storage, retrieval, modification, and deletion of data in conjunction with various data-processing operations. The databases 1114 may consist of a file or sets of files that can be broken down into records, each of which consists of one or more fields. Database information may be retrieved through queries using keywords and sorting commands, in order to rapidly search, rearrange, group, and select the field. The databases 1114 may be any organization of data on a data storage medium, such as one or more servers.

In one embodiment, the databases 1114 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol)

The memory 1110 accessible by the processor 1108 may receive and store data. The memory 1110 may be a main memory, such as a high speed Random Access Memory (RAM), or an auxiliary storage unit, such as a hard disk, flash memory, or a magnetic tape drive. The memory 1110 may be any other type of memory, such as a Read-Only Memory (ROM), Erasable Programmable Read-Only Memory (EPROM), or optical storage media such as a videodisc and a compact disc.

The processor 1108 may access the memory 1110 to retrieve data. The processor 1108 may be any device that can perform operations on data. Examples are a central processing unit (CPU), a front-end processor, a microprocessor, and a network processor. The applications 1112a . . . 1112n are coupled to the processor 1108 and configured to perform various tasks as explained below in more detail. An output may be transmitted to the devices 1106.

Figure 12:
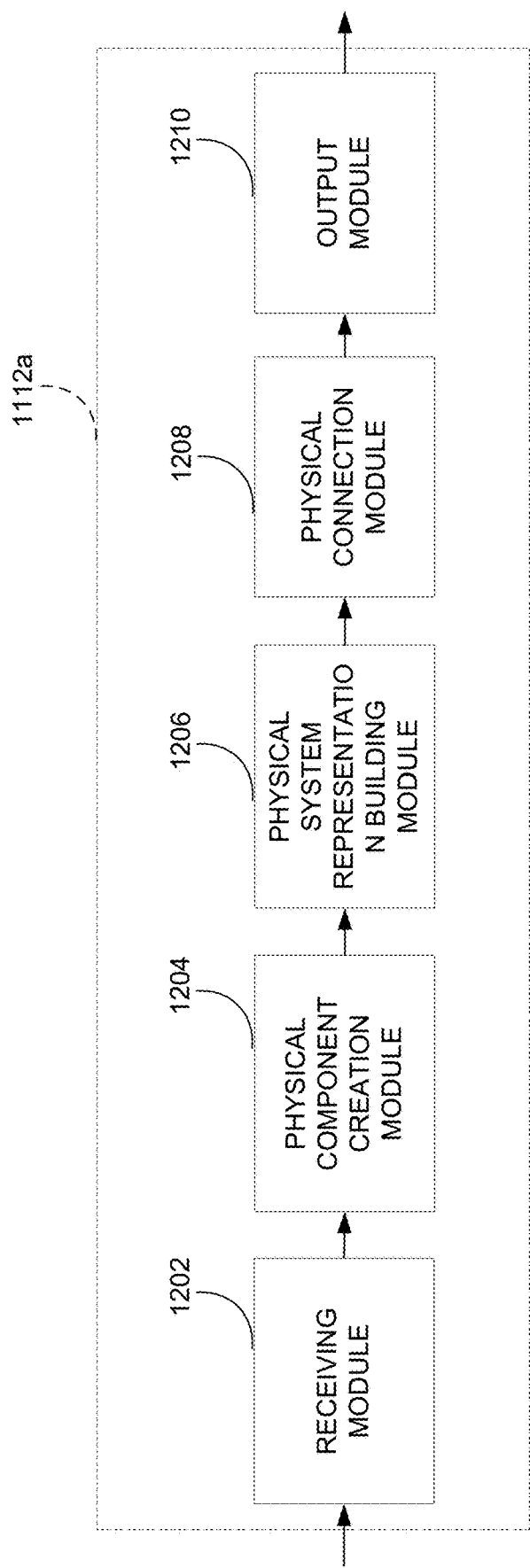
FIG. 12 is a block diagram showing an exemplary application running on the processor of FIG. 11.

FIG. 12 is an exemplary embodiment of an application 1112a running on the processor 1108. The application 1112a may comprise a receiving module 1202 for receiving input data from a user (e.g. through suitable input devices such as a screen, mouse, or the like, provided with the devices 1106) interacting with the graphical modeling environment, a physical component creation module 1204, a physical system representation building module 1206, a physical connection module 1208, and an output module 1210 for outputting data to the user (e.g. through suitable output devices provided with the devices 1106). The physical component creation module 1204 is illustratively used to enable the methods illustrated and described in reference to FIG. 3, FIG. 4a, and FIG. 4b, thereby creating the custom subsystem block representative of a given physical component. The physical system representation building module 1206 is illustratively used to enable the step 104 illustrated and described in reference to FIG. 2, thereby creating the graphical representation of the physical system by interconnecting the custom physical component subsystem blocks and the graphical modeling environment library blocks. It should be understood that, in some embodiments, the graphical representation of the physical system may only comprise physical component subsystems. In other embodiments, both physical component subsystems and graphical modelling environment library blocks may be interconnected. The physical connection module 1208 is illustratively used to enable the methods illustrated and described in reference to FIG. 5, FIG. 6, FIG. 7, FIG. 8, FIG. 9a, and FIG. 9b, thereby creating the graphical representation of the physical system by interconnecting the physical component subsystem blocks and the graphical modeling environment library blocks.

Figure 13:
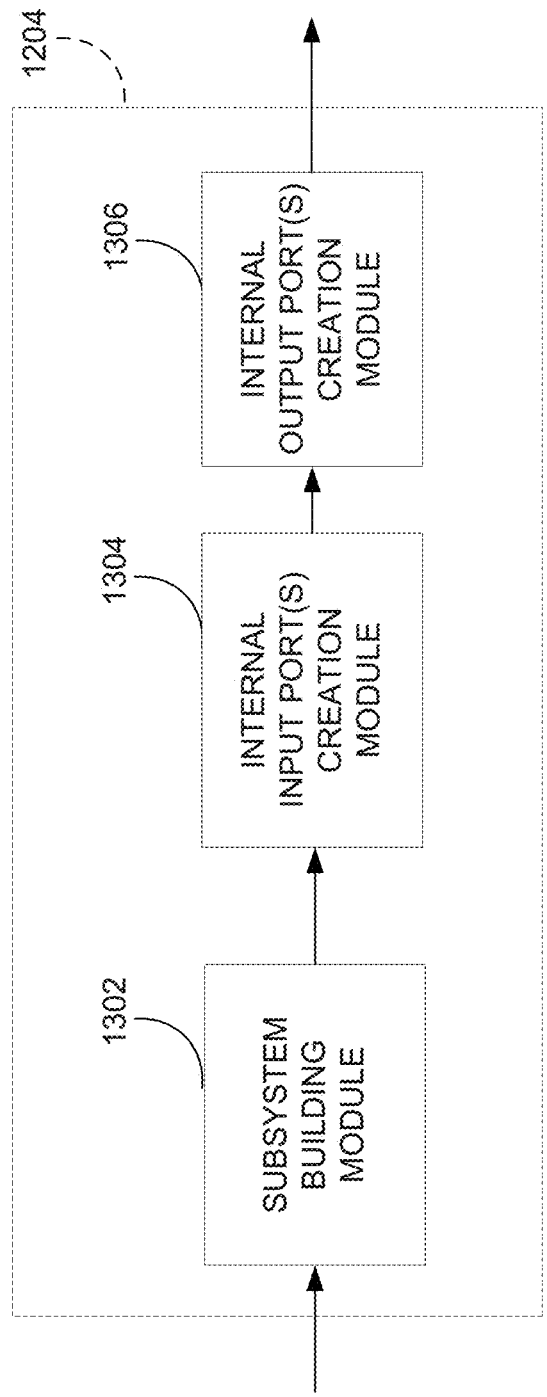
FIG. 13 is a block diagram of the physical component creation module of FIG. 12.

Referring to FIG. 13, the physical component creation module 1204 illustratively comprises a subsystem building module 1302 which enables the method illustrated and described in reference to FIG. 4a and FIG. 4b, and an internal input port(s) creation module 1304 and an internal output port(s) creation module 1306 for forming additional internal input and output port(s) for backward connection, as discussed above with reference to FIG. 3 and steps 204 and 206.

Figure 14:
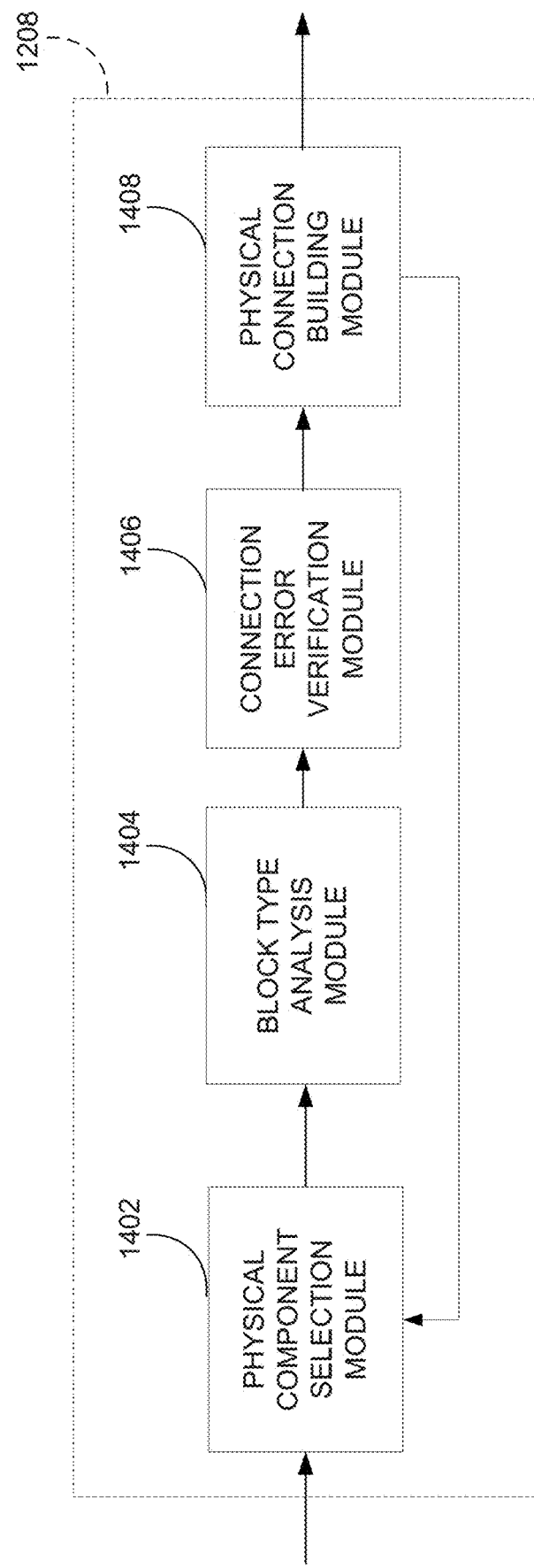
FIG. 14 is a block diagram of the physical connection module of FIG. 12.

Referring to FIG. 14, the physical connection module 1208 illustratively comprises a physical component selection module 1402 for selecting any given physical component (i.e. custom subsystem block) for which backward connection is to be established, as illustrated and described in reference to FIG. 5, a block type analysis module 1404 which enables the method illustrated and described in reference to FIG. 6, a connection error verification module 1406 which enables the method illustrated and described in reference to FIG. 7, and a physical connection building module 1408 which enables the methods illustrated and described in reference to FIG. 8, FIG. 9a, and FIG. 9b.

Figure 15:
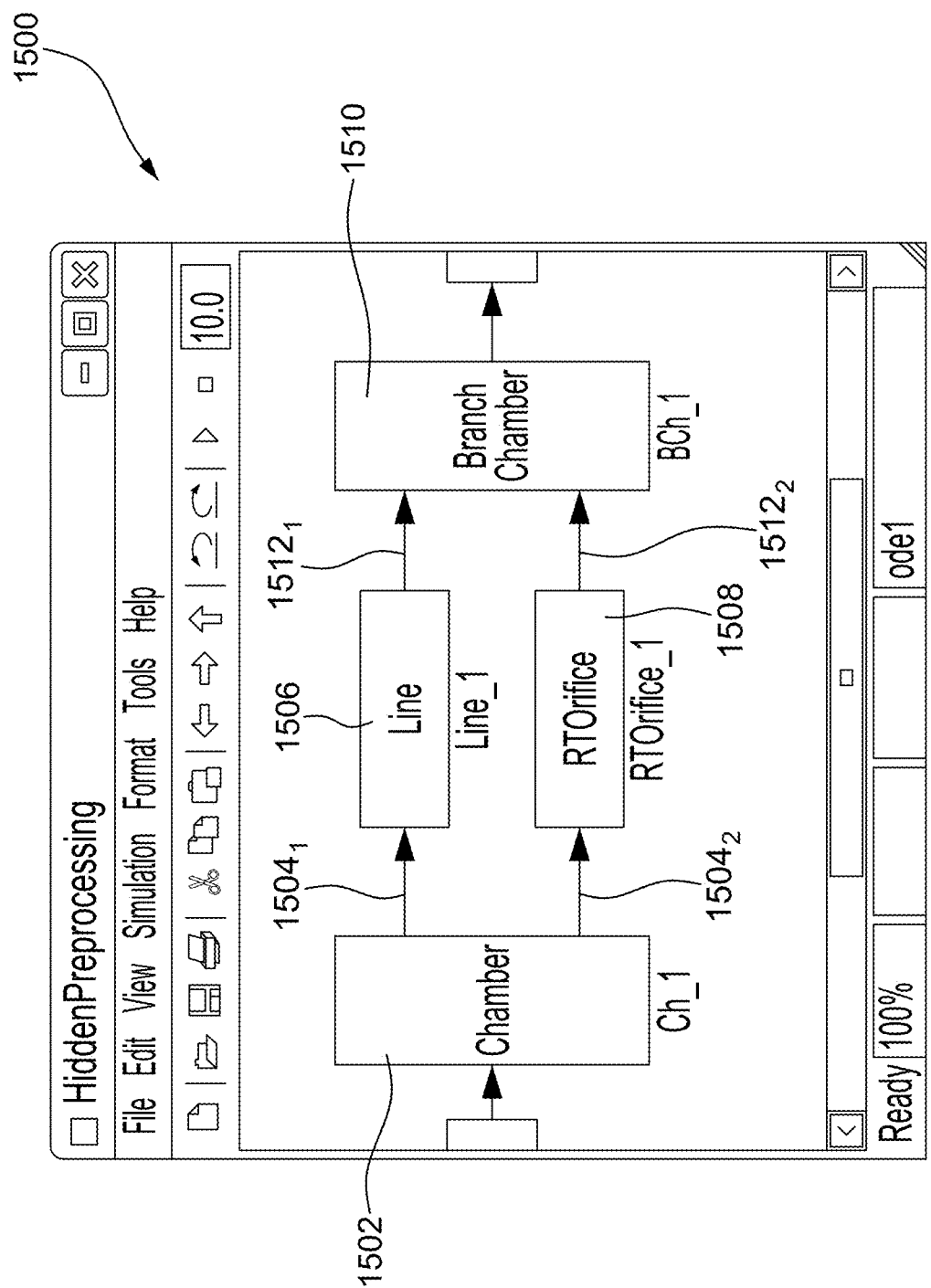
FIG. 15 is a screen capture illustrating a representation of a physical system in a graphical modeling environment, in accordance with one embodiment.

Referring now to FIG. 15, there is shown a screen capture 1500 illustrating a system with physical connection of components, as implemented using the method 100 described above with reference to FIG. 2 to FIG. 10 and/or the system 1100 described above with reference to FIG. 11 to FIG. 14. The system is illustratively a fluid system that comprises a first chamber (or node) 1502 having a first input and two output ports (not shown). The first output port of the chamber 1502 is connected via a first connection (e.g. connection line) $1504_1$ to a first restrictor 1506 while the second output port of the chamber 1502 is connected via a second connection (e.g. connection line) $1504_2$ to a second restrictor 1508. It should be understood that, although the connection lines $1504_1$ and $1504_2$ are visible on the screen capture 1500, they may not be visually displayed in some embodiments. It should also be understood that matching From and Goto blocks may be used as an alternative (or in addition, as discussed above) to connection lines. The first restrictor 1506 and second restrictor 1508 are in turn connected to a branch chamber 1510 via respective connection lines $1512_1$ and $1512_2$.

Figure 16:
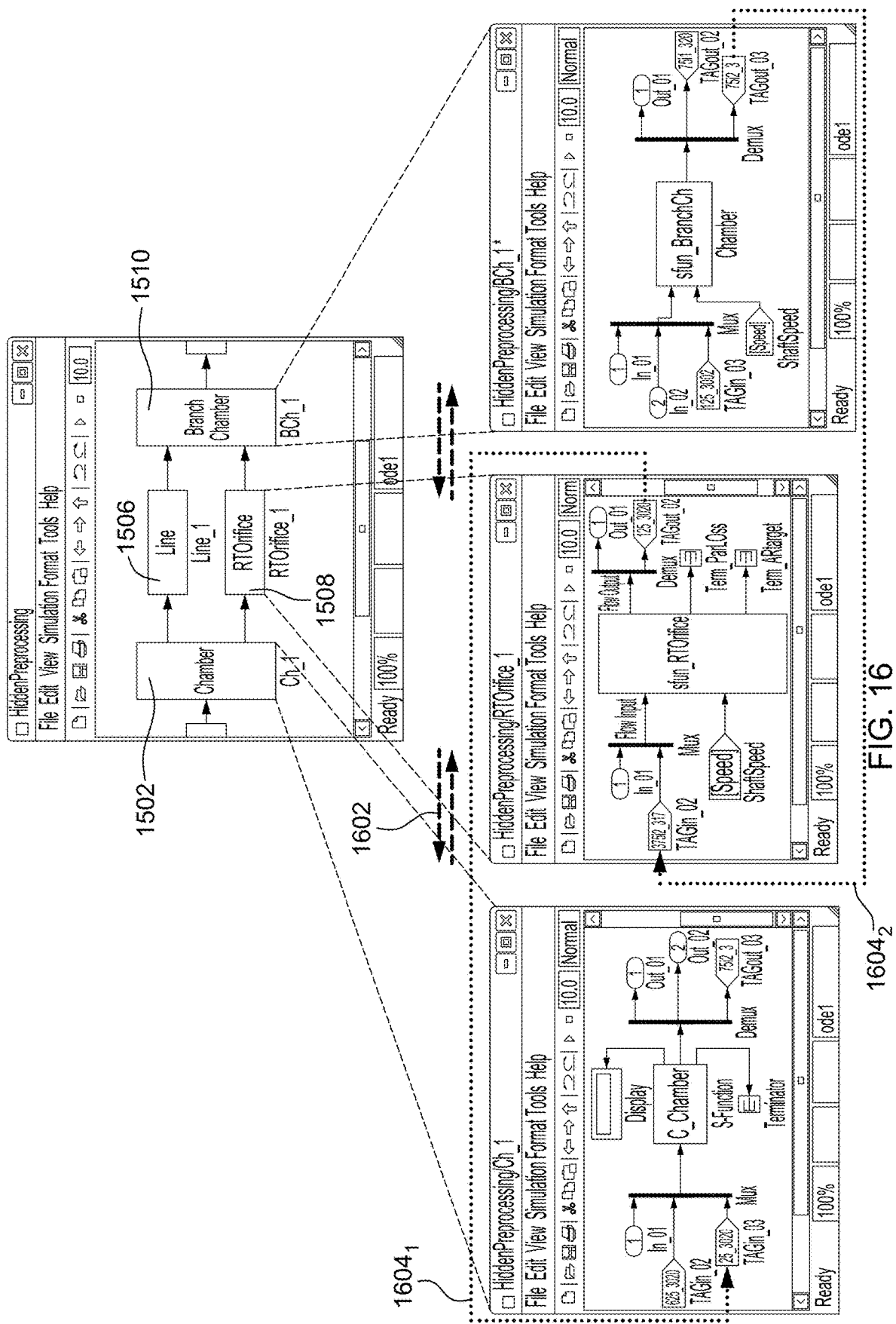
FIG. 16 is a screen capture illustrating the internal structure of subsystem blocks built for the physical system of FIG. 15.

The internal structure of each one of the physical components 1502, 1506, 1508, and 1510 of FIG. 15 as well as bidirectional information exchange 1602 (implemented using the method 100 described above with reference to FIG. 2 to FIG. 10 and/or the system 1100 described above with reference to FIG. 11 to FIG. 14) are shown in FIG. 16. As can be seen in FIG. 16, a first backward connection $1604_1$ is established from an output (not shown) of the second restrictor 1508 to an input (not shown) of the chamber 1502 (e.g. between corresponding From and Goto blocks, not shown) while a second backward connection $1604_2$ is established from an output (not shown) of the branch chamber 1510 to an input (not shown) of the second restrictor 1508 (e.g. between corresponding From and Goto blocks, not shown). It can be seen that the backward connections can be established without any connection lines being provided at the higher level where the physical components 1502, 1506, 1508, and 1510 are arranged.

Figure 17:
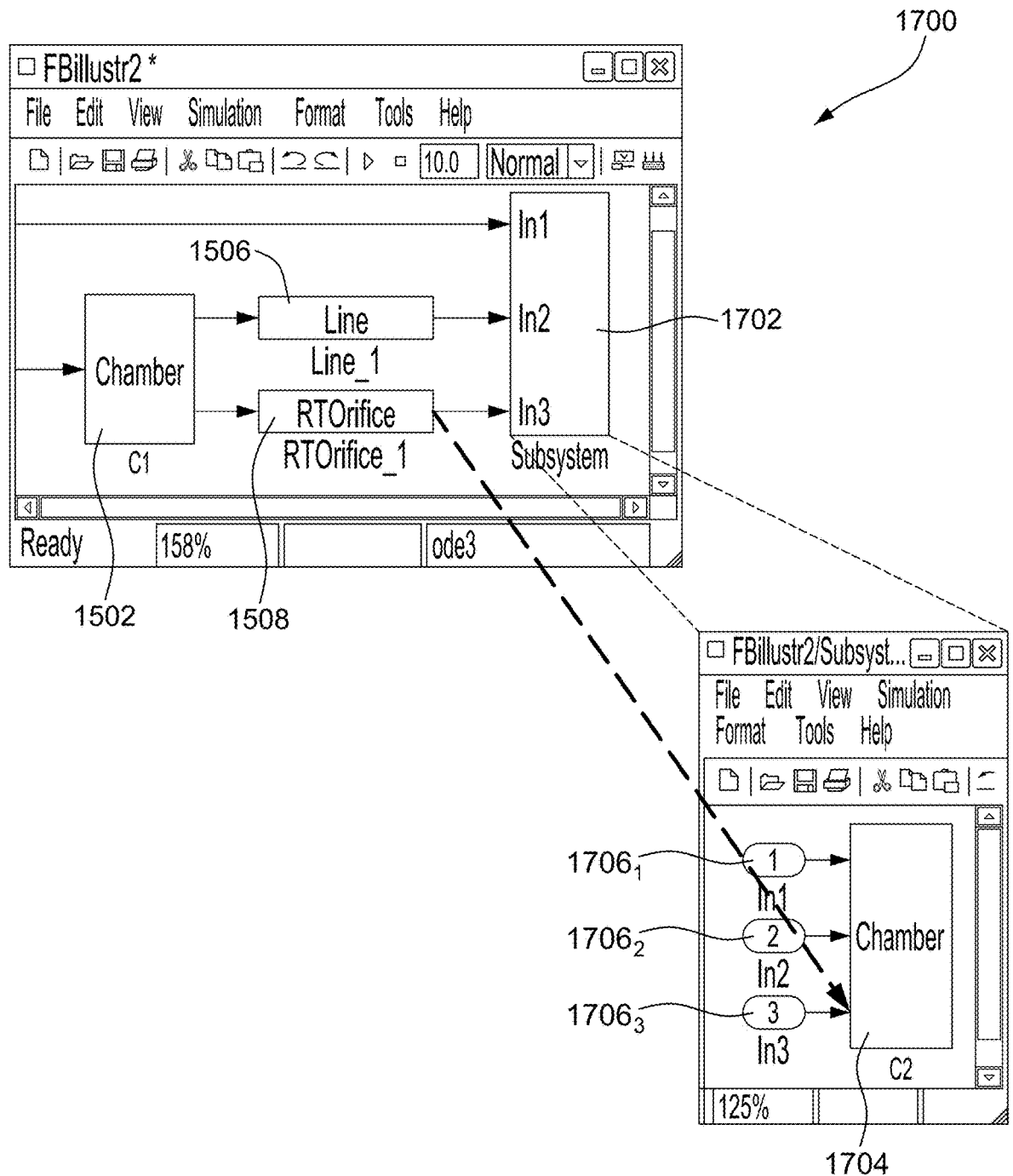
FIG. 17 is a screen capture illustrating an example of a direct search in a subsystem.

Referring now to FIG. 17, there is shown a screen capture 1700 illustrating an example of a direct search in a standard subsystem block as per step 624 of FIG. 6. In the illustrated example, the current initial subsystem block is the restrictor 1508 and the destination block is a standard subsystem block 1702. The standard subsystem block 1702 comprises a chamber 1704, which is built as a custom subsystem block at a lower hierarchical level of the model. The chamber 1704 is the final destination (or downstream) block and has connected thereto three input blocks $1706_1$, $1706_2$, and $1706_3$. Since the restrictor 1508 is to communicate with the chamber 1704 via input block $1706_3$, the latter is considered the lower level destination (or downstream) block, as found further to performing step 626 of FIG. 6.

Figure 18:
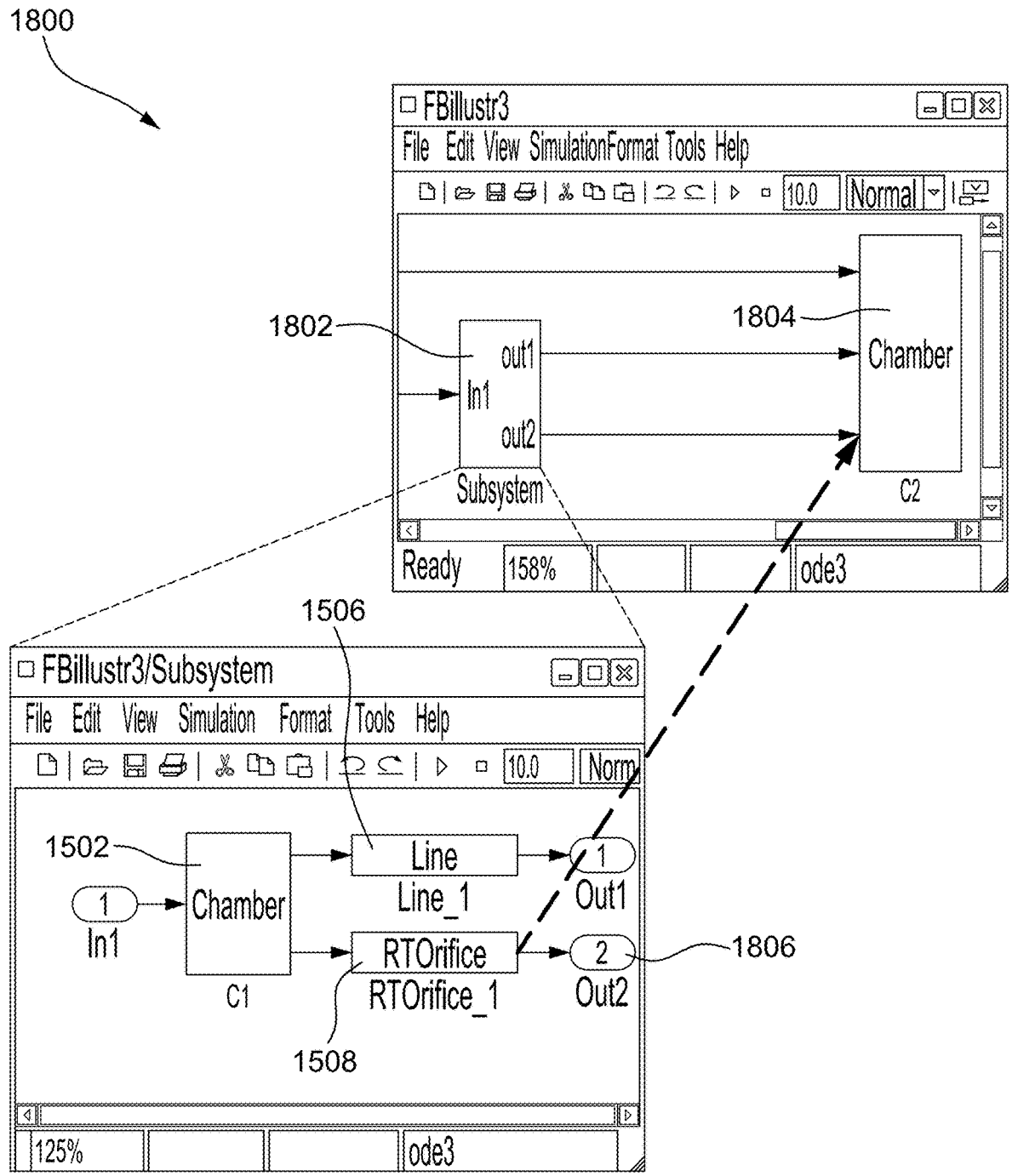
FIG. 18 is a screen capture illustrating an example of a top level search.

Referring now to FIG. 18, there is shown a screen capture 1800 illustrating an example of a top level search as per step 618 of FIG. 6. In the illustrated example, the chamber 1502, restrictor 1506 and restrictor 1508 are combined into a parent standard subsystem block 1802 having one input and two outputs (not shown). The parent subsystem 1802 communicates with a chamber 1804, which is illustratively built as a custom subsystem block and is the final destination block. In particular, in this example, the restrictor 1508 is the current initial subsystem block and the outport 1806 of the restrictor 1508 is the higher level destination block, as found further to performing step 620 of FIG. 6.

Figure 19:
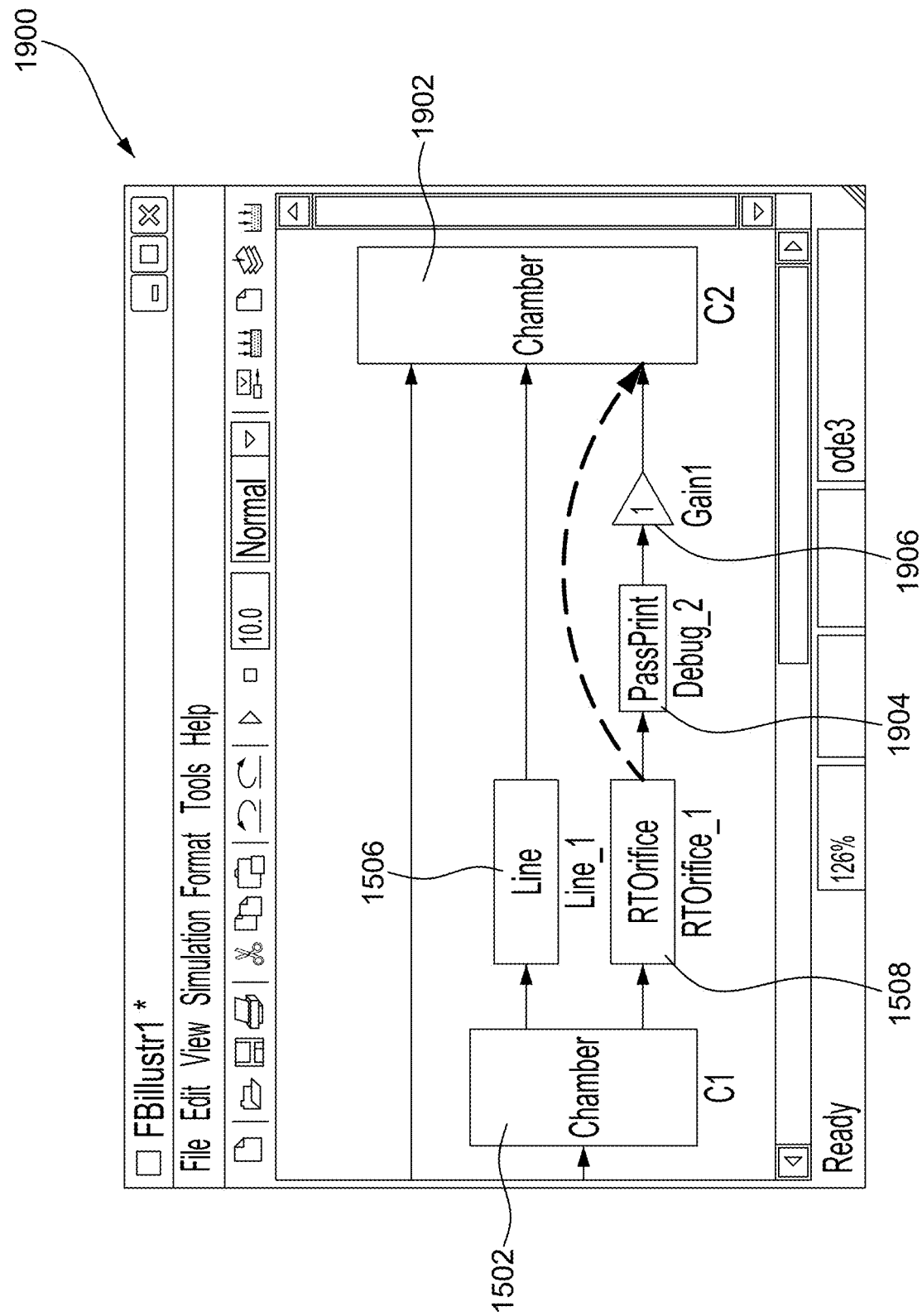
FIG. 19 is a screen capture illustrating an example of a search with an intermediate block.

Referring now to FIG. 19, there is shown a screen capture 1900 illustrating an example of a direct search with intermediate blocks as per step 614 of FIG. 6. In the illustrated example, the restrictor 1508 is the current initial block and communicates with a chamber 1902, which is the final destination block, via a first intermediate debugging block 1904 and a second intermediate gain block 1906.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A computer-implemented method for modeling, using unidirectional graphical components provided in a graphical modeling environment, a physical system having bidirectional signal propagation capability, the method comprising:
using a graphical user interface to build, using the unidirectional graphical components, a model of the physical system in the graphical modeling environment; and
using an execution engine to execute the model of the physical system and trace system outputs as a function of time,
wherein building the model of the physical system in the graphical modeling environment comprises:
providing, for each of a plurality of physical components of the physical system, a physical component subsystem representative of the physical component in the graphical modeling environment; and
providing a hierarchically-arranged representation of the physical system in the graphical modeling environment, by interconnecting a plurality of physical component subsystems for representing a relationship between the plurality of physical components and by establishing, between the plurality of physical components, a physical connection providing bidirectional signal propagation, parameter transfer, signal management, and connection error trapping capabilities,
wherein providing each physical component subsystem comprises using one or more graphical modeling environment library blocks readily available in a built-in library of the graphical modeling environment for:
providing at least one functional block representative of a mathematical model of the physical component,
associating at least one of one or more first unidirectional internal input ports and one or more first unidirectional internal output ports with the at least one functional block, the physical component subsystem configured to receive, from an upstream block located upstream of the at least one functional block, first information through each of the one or more first internal input ports and to output, to a downstream block located downstream of the at least one functional block, second information through each of the one or more first internal output ports, thereby establishing a straightforward connection from the upstream block to the at least one functional block and from the at least one functional block to the downstream block, and associating at least one of one or more second unidirectional internal input ports and one or more second unidirectional internal output ports with the at least one functional block, the physical component subsystem configured to receive third information from the downstream block through each second internal input port and to output fourth information to the upstream block through each second internal output port, thereby establishing a backward connection from the downstream block to the at least one functional block and from the at least one functional block to the upstream block, the established straightforward and backward connection providing the physical component subsystem with bidirectional signal propagation capability provided using only the one or more graphical modeling environment library blocks readily available in the built-in library of the graphical modeling environment.

2. The method of claim 1, wherein providing the physical component subsystem comprising associating a first memory with the physical component, the physical component subsystem built as a masked subsystem using the one or more graphical modeling environment library blocks.

3. The method of claim 2, wherein providing the representation of the physical system comprises, for each of the plurality of physical component subsystems:

providing at least one of one or more unidirectional external input ports and one or more unidirectional external output ports, a first number of the one or more unidirectional external input ports and a second number of the one or more unidirectional external output ports selected for enabling connection of the physical component subsystem to the upstream block and to the downstream block, respectively connecting, via a first unidirectional connection, an external output port of the upstream block to a selected one of the one or more external input ports of the physical component subsystem, the physical component subsystem receiving the first information from the upstream block through the first connection; and connecting, via a second unidirectional connection, a selected one of the one or more external output ports of the physical component subsystem to an external input port of the downstream block, the physical component subsystem outputting the second information to the downstream block through the second connection.

4. The method of claim 3, wherein providing the physical component subsystem comprises:

providing the one or more second internal input ports and one or more signal receiving blocks in the second number and providing the one or more second internal output ports and one or more signal sending blocks in the first number;

providing at least one of one or more input blocks and one or more output blocks;

connecting at least one of the one or more first internal input ports to a corresponding one of the one or more input blocks and at least one of the one or more first internal output ports to a corresponding one of the one or more output blocks;

connecting each of the one or more second internal input ports to an output of a corresponding one of the one or more signal receiving blocks and each of the one or more second internal output ports to an input of a corresponding one of the one or more signal sending blocks; and linking each input block to a corresponding one of the one or more external input ports and each output block to a corresponding one of one or more external output ports.

5. The method of claim 4, wherein providing the physical component subsystem comprises:

providing at least one of a signal grouping block and a signal de-grouping block;

connecting an output of the signal grouping block to an input of the at least one functional block and at least one input block to at least one input of the signal grouping block; and connecting an input of the signal de-grouping block to an output of the at least one functional block and at least one output block to at least one output of the signal de-grouping block, the one or more first and second internal input ports of the physical component subsystem comprised of inputs of the signal grouping block and the one or more first and second internal output ports of the physical component subsystem comprised of outputs of the signal de-grouping block.

6. The method of claim 4, wherein providing the representation of the physical system comprises interconnecting the plurality of physical component subsystems with a plurality of the graphical modeling environment library blocks and establishing the physical connection by:

(a) identifying the plurality of physical component subsystems;

(b) selecting a first one of the plurality of physical component subsystems and a first port among the at least one of the one or more external input ports and the one or more external output ports of the first physical component subsystem for which to establish the physical connection;

(c) setting the first physical component subsystem as a current initial physical component subsystem and the first port as a current initial port;

(d) searching for all blocks and corresponding ports thereof directly connected to the current initial physical component subsystem and current initial port at a same hierarchical level of the representation of the physical system, the directly connected blocks comprising at least one of physical component subsystems and graphical modeling environment library blocks;

(e) identifying and analyzing a type of each one of the directly connected blocks;

(f) determining whether one or more connection errors are present;

(g) if no connection error is present and the directly connected block is a physical component subsystem, establishing the physical connection for the current initial physical component subsystem and the current initial port;

(h) if the one or more connection errors are present, interrupting establishment of the physical connection for the current initial physical component subsystem and the current initial port;

(i) if more of the plurality of physical component subsystems remain, selecting a next one of the plurality of physical component subsystems and a next port among the at least one of one or more external input ports and the one or more external output ports of the next physical component subsystem for which physical connection is to be established, setting the next physical component subsystem as the current initial physical component subsystem and the next port as the current initial port, and repeating steps (d) to (i).

7. The method of claim 6, wherein providing the physical component subsystem comprises creating a unique first block type identifier for the physical component subsystem and storing the first block type identifier in the first memory, wherein a second memory has stored therein a second block type identifier associated with each one of the plurality of graphical modeling environment library blocks, and further wherein identifying the plurality of physical component subsystems comprises querying the first and the second memory to evaluate the first block type identifier and the second block type identifier for determining a type of each one of the plurality of physical component subsystems and graphical modeling environment library blocks.

8. The method of claim 7, wherein identifying and analyzing a type of each one of the directly connected blocks comprises:
    obtaining the type of the directly connected block by querying the first and the second memory to evaluate the one of the first block type identifier and the second block type identifier associated with the directly connected block;
    if the directly connected block is a physical component subsystem, writing the first block type identifier associated with the directly connected block and a number of the corresponding port to a list of physical component subsystems directly connected to the current initial physical component subsystem;
    if the directly connected block is one of a sink block and source block, creating a record about existence of one of a sink and a source block;
    if the directly connected block is an intermediate block connected at a given hierarchical level between the current initial physical component subsystem and another block, searching for all blocks directly connected to the intermediate block at a same hierarchical level of the representation of the physical system and repeating the type identifying and analyzing steps for the blocks directly connected to the intermediate block;
    if the directly connected block is one of an input block and an output block, searching for a block linked to the one of the input block and the output block at a higher hierarchical level of the representation of the physical system, searching for a number of the corresponding port of the higher hierarchical level block, searching for all blocks directly connected to the higher hierarchical level block, and repeating the type identifying and analyzing steps for the blocks directly connected to the higher hierarchical level block; and
    if the directly connected block is a graphical modeling environment library subsystem block, searching for one of an input block and an output block of the graphical modelling environment library subsystem block provided at a lower hierarchical level of the representation of the physical system, searching for a number of the corresponding port of the one of the lower level input block and output block, searching for all blocks directly connected to the one of the lower level input block and output block, and repeating the type identifying and analyzing steps for the blocks directly connected to the one of the lower level input block and output block.

9. The method of claim 8, wherein determining whether one or more connection errors are present comprises:
    analyzing the list of physical component subsystems directly connected to the current initial physical component subsystem and the record about existence of the one of the sink and the source block;
    applying at least one connection rule and determining whether the one or more connection errors are present accordingly; and
    if the one or more connection errors are present, creating an error record, determining at least one action applicable in accordance with the one or more connection errors, and taking the at least one action.

10. The method of claim 7, wherein the physical connection is established between the current initial physical component subsystem and a block connected thereto via the current initial port by:
    selecting one of the one or more second internal input ports and the one or more second internal output ports of the current initial physical component subsystem;
    deleting any block connected to the selected second internal port of the current initial physical component subsystem;
    determining a type of the block connected to the current initial physical component subsystem;
    if the block connected to the current initial physical component subsystem is one of a sink block and a source block, terminating establishment of the physical connection by one of connecting another one of the sink block and the source block to the selected second internal port of the current initial physical component subsystem and leaving the selected second internal port of the current initial physical component subsystem disconnected;
    otherwise, determining that the block connected to the current initial physical component subsystem is a physical component subsystem and connecting a first unidirectional signal routing block to the selected second internal port of the current initial physical component subsystem, the first signal routing block comprising one of a signal receiving block and a signal sending block;
    assigning a first tag parameter to the first signal routing block;
    selecting one of the one or more second internal input ports and the one or more second internal output ports of the connected block, and
    deleting any block connected to the selected second internal port of the connected block and connecting a second unidirectional signal routing block to the selected second internal port of the connected block, the second signal routing block being assigned a second tag parameter matching the first tag parameter.

11. The method of claim 10, wherein the first memory associated with the current initial physical component subsystem has stored therein at least one first parameter of the current initial physical component subsystem and the second memory associated with the connected block has stored therein at least one second parameter of the connected block, and wherein establishing the physical connection further comprises:
    calculating, on the basis of the type of the current initial physical component subsystem and of the type of the block connected to the current initial physical component subsystem, a first width of a backward signal to be one of sent to and received from the connected block via the selected second internal port of the current initial physical component subsystem and a second width of a straightforward signal one of received from and sent to the connected block via the current initial port;

assigning the first width and the second width to the first and the second memory; and conducting parameter transfer between the current initial physical component subsystem and the connected block by reading the at least one first and the at least one second parameter from the first and the second memory, writing the at least one second parameter to the first memory and the at least one first parameter to the second memory.

12. The method of claim 6, wherein searching for all blocks and corresponding ports directly connected to the current initial physical component subsystem comprises:

searching, for each external input port of the current initial physical component subsystem, for an upstream block and a corresponding port thereof connected to the external input port; and/or searching, for each external output port of the current initial physical component subsystem, for a downstream block and a corresponding port thereof connected to the external output port.

13. The method of claim 12, comprising, for each one of the plurality of physical component subsystems, creating a connectivity record identifying the directly connected blocks and corresponding ports, and verifying each connectivity record further to selecting each next physical component subsystem.

14. The method of claim 6, wherein searching for all blocks and corresponding ports directly connected to the current initial physical component subsystem and current initial port comprises:

obtaining connection identifiers for each first unidirectional connection and each second unidirectional connection connected to the current initial physical component subsystem;

obtaining port identifiers for each external input port and each external output port of the current initial physical component subsystem;

assessing whether the connection identifiers match the port identifiers; and if the connection identifier of a given first connection matches the port identifier of a given external input port, identifying the current initial physical component subsystem as directly connected to a given upstream block connected to the given first connection, if the connection identifier of a given second connection matches the port identifier of a given external output port, identifying the current initial physical component subsystem as directly connected to a given downstream block connected to the given second connection.

15. The method of claim 6, further comprising, for each physical component subsystem, storing in the first memory each event of establishment of the physical connection, inspecting all physical connections established for the physical component subsystem, and outputting an error message in the event of a missing physical connection for a given port of the physical component subsystem.

16. A system for modeling, using unidirectional graphical components provided in a graphical modeling environment, a physical system having bidirectional signal propagation capability, the system comprising:

a memory;

a processor; and at least one application stored in the memory and executable by the processor for:

building, using a graphical user interface and the unidirectional graphical components, a model of a physical system in the graphical modeling environment, and executing the model of the physical system to trace system outputs as a function of time, wherein building the model of the physical system in the graphical modeling environment comprises:

providing, for each of a plurality of physical components of the physical system, a physical component subsystem representative of the physical component in the graphical modeling environment; and providing a hierarchically-arranged representation of the physical system in the graphical modeling environment, by interconnecting a plurality of physical component subsystems for representing a relationship between the plurality of physical components and by establishing, between the plurality of physical components, a physical connection providing bidirectional signal propagation, parameter transfer, signal management, and connection error trapping capabilities, wherein providing each physical component subsystem comprises using one or more graphical modeling environment library blocks readily available in a built-in library of the graphical modeling environment for:

providing at least one functional block representative of a mathematical model of the physical component, associating at least one of one or more first unidirectional internal input ports and one or more first unidirectional internal output ports with the at least one functional block, the physical component subsystem configured to receive, from an upstream block located upstream of the at least one functional block, first information through each of the one or more first internal input ports and to output, to a downstream block located downstream of the at least one functional block, second information through each of the one or more first internal output ports, thereby establishing a straightforward connection from the upstream block to the at least one functional block and from the at least one functional block to the downstream block, and associating at least one of one or more second unidirectional internal input ports and one or more second unidirectional internal output ports with the at least one functional block, the physical component subsystem configured to receive third information from the downstream block through each second internal input port and to output fourth information to the upstream block through each second internal output port, thereby establishing a backward connection from the downstream block to the at least one functional block and from the at least one functional block to the upstream block, the established straightforward and backward connection providing the physical component subsystem with bidirectional signal propagation capability provided using only the one or more graphical modeling environment library blocks readily available in the built-in library of the graphical modeling environment.

17. The system of claim 16, wherein the at least one application is executable by the processor for providing the representation of the physical system comprising, for each of the plurality of physical component subsystems:

providing at least one of one or more unidirectional external input ports and one or more unidirectional external output ports, a first number of the one or more unidirectional external input ports and a second number of the one or more unidirectional external output ports selected for enabling connection of the physical component subsystem to the upstream block and to the downstream block, respectively;

connecting, via a first unidirectional connection, an external output port of the upstream block to a selected one of the one or more external input ports of the physical component subsystem, the physical component subsystem receiving the first information from the upstream block through the first connection; and connecting, via a second unidirectional connection, a selected one of the one or more external output ports of the physical component subsystem to an external input port of the downstream block, the physical component subsystem outputting the second information to the downstream block through the second connection.

18. The system of claim 17, wherein the at least one application is executable by the processor for providing the physical component subsystem comprising:

providing the one or more second internal input ports and one or more signal receiving blocks in the second number and providing the one or more second internal output ports and one or more signal sending blocks in the first number;

providing at least one of one or more input blocks and one or more output blocks;

connecting at least one of the one or more first internal input ports to a corresponding one of the one or more input blocks and at least one of the one or more first internal output ports to a corresponding one of the one or more output blocks;

connecting each of the one or more second internal input ports to an output of a corresponding one of the one or more signal receiving blocks and each of the one or more second internal output ports to an input of a corresponding one of the one or more signal sending blocks; and linking each input block to a corresponding one of the one or more external input ports and each output block to a corresponding one of one or more external output ports.

19. The system of claim 18, wherein the at least one application is executable by the processor for providing the representation of the physical system comprising interconnecting the plurality of physical component subsystems with a plurality of the graphical modeling environment library blocks and establishing the physical connection by:

(a) identifying the plurality of physical component subsystems;

(b) selecting a first one of the plurality of physical component subsystems and a first port among the at least one of the one or more external input ports and the one or more external output ports of the first physical component subsystem for which to establish the physical connection;

(c) setting the first physical component subsystem as a current initial physical component subsystem and the first port as a current initial port;

(d) searching for all blocks and corresponding ports thereof directly connected to the current initial physical component subsystem and current initial port at a same hierarchical level of the representation of the physical system, the directly connected blocks comprising at least one of physical component subsystems and graphical modeling environment library blocks;

(e) identifying and analyzing a type of each one of the directly connected blocks;

(f) determining whether one or more connection errors are present;

(g) if no connection error is present and the directly connected block is a physical component subsystem, establishing the physical connection for the current initial physical component subsystem and the current initial port;

(h) if the one or more connection errors are present, interrupting establishment of the physical connection for the current initial physical component subsystem and the current initial port;

(i) if more of the plurality of physical component subsystems remain, selecting a next one of the plurality of physical component subsystems and a next port among the at least one of one or more external input ports and the one or more external output ports of the next physical component subsystem for which physical connection is to be established, setting the next physical component subsystem as the current initial physical component subsystem and the next port as the current initial port, and repeating steps (d) to (i).

20. The system of claim 19, wherein the memory comprises a first memory and a second memory, the at least one application executable by the processor for providing the physical component subsystem comprising associating the first memory with the physical component subsystem, creating a unique first block type identifier for the physical component subsystem, and storing the first block type identifier in the first memory, the second memory having stored therein a second block type identifier associated with each one of the plurality of graphical modeling environment library blocks, the at least one application executable by the processor for identifying the plurality of physical component subsystems comprising querying the first and the second memory to evaluate the first block type identifier and the second block type identifier for determining a type of each one of the plurality of physical component subsystems and graphical modeling environment library blocks.

21. The system of claim 20, wherein the at least one application is executable by the processor for identifying and analyzing a type of each one of the directly connected blocks comprising obtaining the type of the directly connected block by querying the first and the second memory to evaluate the one of the first block type identifier and the second block type identifier associated with the directly connected block;

if the directly connected block is a physical component subsystem of the custom type, writing the first block type identifier associated with the directly connected block and a number of the corresponding port to a list of physical component subsystems directly connected to the current initial physical component subsystem;

if the directly connected block is one of a sink block and source block, creating a record about existence of one of a sink and a source block;

if the directly connected block is an intermediate block connected at a given hierarchical level between of the current initial physical component subsystem and another block, searching for all blocks directly connected to the intermediate block at a same hierarchical level of the representation of the physical system and repeating the type identifying and analyzing steps for the blocks directly connected to the intermediate block;

if the directly connected block is one of an input block and an output block, searching for a block linked to the one of the input block and the output block at a higher hierarchical level of the representation of the physical system, searching for a number of the corresponding port of the higher hierarchical level block, searching for all blocks directly connected to the higher hierarchical level block, and repeating the type identifying and analyzing steps for the blocks directly connected to the higher hierarchical level block; and if the directly connected block is a graphical modeling environment library subsystem block, searching for one of an input block and an output block of the graphical modeling environment library subsystem block provided at a lower hierarchical level of the representation of the physical system, searching for a number of the corresponding port of the one of the lower level input block and output block, searching for all blocks directly connected to the one of the lower level input block and output block, and repeating the type identifying and analyzing steps for the blocks directly connected to the one of the lower level input block and output block.

22. The system of claim 21, wherein the at least one application is executable by the processor for determining whether one or more connection errors are present comprising:

analyzing the list of physical component subsystems directly connected to the current initial physical component subsystem and the record about existence of the one of the sink and the source block;

applying at least one connection rule and determining whether the one or more connection errors are present accordingly; and if the one or more connection errors are present, creating an error record, determining at least one action applicable in accordance with the one or more connection errors, and taking the at least one action.

23. The system of claim 20, wherein the at least one application is executable by the processor for establishing physical connection between the current initial physical component subsystem and a block connected thereto via the current initial port by:

selecting one of the one or more second internal input ports and the one or more second internal output ports of the current initial physical component subsystem;

deleting any block connected to the selected second internal port of the current initial physical component subsystem;

determining a type of the block connected to the current initial physical component subsystem;

if the block connected to the current initial physical component subsystem is one of a sink block and a source block, terminating establishment of the physical connection by one of connecting another one of the sink block and the source block to the selected second internal port of the current initial physical component subsystem and leaving the selected second internal port of the current initial physical component subsystem disconnected;

otherwise, determining that the block connected to the current initial physical component is a custom physical component subsystem and connecting a first unidirectional signal routing block to the selected second internal port of the current initial physical component subsystem, the first signal routing block comprising one of a signal receiving block and a signal sending block;

assigning a first tag parameter to the first signal routing block;

selecting one of the one or more second internal input ports and the one or more second internal output ports of the connected block, deleting any block connected to the selected second internal port of the connected block, and connecting a second unidirectional signal routing block to the selected second internal port of the connected block, the second signal routing block being assigned a second tag parameter matching the first tag parameter.

24. The system of claim 23, wherein the first memory associated with the current initial physical component subsystem has stored therein at least one first parameter of the current initial physical component subsystem and the second memory associated with the connected block has stored therein at least one second parameter of the connected block, and wherein the at least one application is executable by the processor for establishing the physical connection further comprising:

calculating, on the basis of the type of the current initial physical component subsystem and of the type of the block connected to the current initial physical component subsystem, a first width of a backward signal to be one of sent to and received from the connected block via the selected second internal port of the current initial physical component subsystem and a second width of a straightforward signal one of received from and sent to the connected block via the current initial port; assigning the first width and the second width to the first and the second memory; and conducting parameter transfer between the current initial physical component subsystem and the connected block by reading the at least one first and the at least one second parameter from the first and the second memory, writing the at least one second parameter to the first memory and the at least one first parameter to the second memory.

25. The system of claim 19, wherein the at least one application is executable by the processor for searching for all blocks and corresponding ports directly connected to the current initial physical component subsystem and current initial port comprising:

obtaining connection identifiers for each first unidirectional connection line and each second unidirectional connection connected to the current initial physical component subsystem;

obtaining port identifiers for each external input port and each external output port of the current initial physical component subsystem;

assessing whether the connection identifiers match the port identifiers; and if the connection identifier of a given first connection matches the port identifier of a given external input port, identifying the current initial physical component subsystem as directly connected to a given upstream block connected to the given first connection, if the connection identifier of a given second connection matches the port identifier of a given external output port, identifying the current initial physical component subsystem as directly connected to a given downstream block connected to the given second connection.

* * * * *